US008937127B2

(12) United States Patent
Sybert et al.

(10) Patent No.: US 8,937,127 B2
(45) Date of Patent: *Jan. 20, 2015

(54) FLAME RETARDANT POLY(SILOXANE-ETHERIMIDE) COPOLYMER COMPOSITIONS, METHODS OF MANUFACTURE, AND ARTICLES FORMED THEREFROM

(75) Inventors: Paul D. Sybert, Evansville, IN (US); Thomas L. Evans, Mt. Vernon, IN (US)

(73) Assignee: SABIC Global Technologies B.V. (NL)

( * ) Notice: Subject to any disclaimer, the term of this patent is extended or adjusted under 35 U.S.C. 154(b) by 39 days.

This patent is subject to a terminal disclaimer.

(21) Appl. No.: 13/251,130

(22) Filed: Sep. 30, 2011

(65) Prior Publication Data

US 2013/0085240 A1    Apr. 4, 2013

(51) Int. Cl.
| | |
|---|---|
| C08L 69/00 | (2006.01) |
| C08L 79/08 | (2006.01) |
| C08G 73/10 | (2006.01) |
| C09K 21/14 | (2006.01) |
| C08L 83/12 | (2006.01) |
| C08G 77/455 | (2006.01) |
| C08G 77/46 | (2006.01) |

(52) U.S. Cl.
CPC .............. *C08G 73/106* (2013.01); *C09K 21/14* (2013.01); *C08G 73/1042* (2013.01); *C08G 73/1046* (2013.01); *C08L 69/00* (2013.01); *C08L 79/08* (2013.01); *C08L 83/12* (2013.01); *C08G 77/455* (2013.01); *C08G 77/46* (2013.01)
USPC ........ 524/430; 428/220; 428/412; 428/473.5; 524/537; 524/538; 525/420; 525/423; 525/430; 525/431; 525/433; 525/436; 525/439; 525/464; 525/474; 525/476

(58) Field of Classification Search
USPC ......... 525/420, 423, 430, 431, 433, 436, 439, 525/464, 474, 476; 524/430, 537, 538; 428/220, 412, 473.5
See application file for complete search history.

(56) References Cited

U.S. PATENT DOCUMENTS

| | | | |
|---|---|---|---|
| 3,751,400 | A | 8/1973 | Crennan et al. |
| 3,929,908 | A | 12/1975 | Orlando et al. |
| 4,170,711 | A | 10/1979 | Orlando et al. |
| 4,404,350 | A | 9/1983 | Ryang |
| 4,443,581 | A | 4/1984 | Robeson et al. |
| 4,923,933 | A | 5/1990 | Curry |
| 5,451,632 | A | 9/1995 | Okumura et al. |
| 5,981,661 | A | 11/1999 | Liao et al. |
| 6,031,036 | A | 2/2000 | Rosenquist et al. |
| 6,140,399 | A | 10/2000 | Munro |
| 6,462,111 | B1 | 10/2002 | Singh et al. |
| 6,723,864 | B2 | 4/2004 | Silva et al. |
| 6,753,367 | B2 | 6/2004 | Goossens et al. |
| 6,822,041 | B2 | 11/2004 | Schottland et al. |
| 6,833,422 | B2 | 12/2004 | Silva et al. |
| 7,253,223 | B2 | 8/2007 | Kawato et al. |
| 7,309,730 | B2 | 12/2007 | Kim |
| 7,652,107 | B2 | 1/2010 | Gallucci et al. |
| 7,790,292 | B2 | 9/2010 | Colborn et al. |
| 7,928,168 | B2 | 4/2011 | Li et al. |
| 2005/0085580 | A1 | 4/2005 | Marugan et al. |
| 2005/0250882 | A1 | 11/2005 | Geprags |
| 2006/0030664 | A1 | 2/2006 | Kim |
| 2007/0135569 | A1 | 6/2007 | DeRudder |
| 2008/0230751 | A1 | 9/2008 | Li et al. |
| 2009/0043053 | A1 | 2/2009 | Gorny et al. |
| 2011/0098386 | A1 | 4/2011 | Krauter et al. |

FOREIGN PATENT DOCUMENTS

| | | |
|---|---|---|
| DE | 102008054329 A1 | 5/2010 |
| EP | 0417513 | 3/1991 |
| EP | 0524731 A1 | 1/1993 |
| EP | 0899306 B1 | 11/2004 |
| WO | 2010005486 A3 | 1/2010 |

OTHER PUBLICATIONS

U.S. Appl. No. 13/207,930, filed with the UPSTO on Aug. 11, 2011.
U.S. Appl. No. 13/251,122, filed with the USPTO on Sep. 30, 2011.
U.S. Appl. No. 13/251,137, filed with the USTPO on Sep. 30, 2011.
EVONIK Industries, Europlex 99470 CF130, 2010, 8 pages.
"Federal Aviation Administration Section 28.853", Federal Aviation Regulations [online], retrieved on Nov. 18, 2011; from http://www.gpo.gov/fdsys/pkg/CFR-2011-title14-vol1/pdf/CFR-2011-title14-vol1-sec25-853.pdf, 51 pages.
Federal Aviation Regulations Section 25, Appendix F, Part IV, Federal Aviation Regulations [online], retrieved on Nov. 18, 2011; from http://www.gpo.gov/fdsys/pkg/CFR-2011-title14-vol1/pdf/CFR-2011-title14-vol1-part25-appF.pdf , 51 pages.
Innes et al., "Flame retardants for polycarbonate—new and classical solutions", Plastics Additives & Compounding, Jan.-Feb. 2006: pp. 26-29.
Lexan EXL9930 Catalog, 2004, pp. 1-6.

(Continued)

*Primary Examiner* — Ana Woodward
(74) *Attorney, Agent, or Firm* — Cantor Colburn LLP

(57) ABSTRACT

A composition comprising: a first polymer comprising a poly (etherimide-siloxane) copolymer comprising (a) a repeating polyetherimide unit, and (b) a poly(siloxane) block unit, a second polymer different from the first polymer and comprising bromine; and optionally, a third polymer comprising a polycarbonate different from the first polymer and second polymer; wherein polysiloxane block units are present in the composition in an amount of at least 0.3 wt %, and bromine is present in the composition in an amount of at least 7.8 wt %, each based on the sum of the wt % of the first, second, and third polymers; and further wherein an article molded from the composition has an OSU integrated 2 minute heat release test value of less than 65 kW-min/m$^2$ and a peak heat release rate of less than 65 kW/m$^2$, and an E662 smoke test Dmax value of less than 200.

29 Claims, 1 Drawing Sheet

(56) References Cited

OTHER PUBLICATIONS

Lexan resin FST9705 Datasheet. Last updated Jan. 6, 2011, 2 pages.
U.S. Appl. No. 13/207,939, filed with the USPTO on Aug. 11, 2011.
U.S. Appl. No. 13/207,946, filed with the USPTO on Aug. 11, 2011.
U.S. Appl. No. 13/436,782, filed with the USPTO on Mar. 30, 2012.
U.S. Appl. No. 13/436,787, filed with the USPTO on Mar. 30, 2012.
U.S. Appl. No. 13/436,791, filed with the USPTO on Mar. 30, 2012.
International Search Report for International Application No. PCT/US2012/031132, International Filing Date Mar. 29, 2012, Date of Mailing Jun. 13, 2012, 5 pages.
Written Opinion for International Application No. PCT/US2012/031132, International Filing Date Mar. 20, 2012, Date of Mailing Jun. 13, 2012, 7 pages.
International Search Report for International Application No. PCT/US2012/057335, International Filing Date Sep. 26, 2012, Date of Mailing Feb. 8, 2013, 5 pages.
Written Opinion for International Application No. PCT/US2012/057335, International Filing Date Sep. 26, 2012, Date of Mailing Feb. 8, 2013, 9 pages.

FLAME RETARDANT POLY(SILOXANE-ETHERIMIDE) COPOLYMER COMPOSITIONS, METHODS OF MANUFACTURE, AND ARTICLES FORMED THEREFROM

BACKGROUND OF THE INVENTION

This disclosure generally relates to polymer compositions, and more particularly to flame retardant poly(siloxane-etherimide) copolymer compositions containing specific combinations of siloxane block copolymers.

Flame retardant (FR) polymers and polymer blends, for example polycarbonates and polycarbonate blends with UL V0 and 5V A and B Underwriters Laboratories flammability ratings are widely prepared and used, especially in a wide variety of electrical and electronic applications. Conversely, only a very limited set of polycarbonates are used in aircraft and other transportation applications particularly interior parts such as windows, partition walls, ceiling panels, cabinet walls, storage compartments, galley surfaces, light panels, and the like. All of these applications have stringent flammability safety requirements that the polycarbonates must meet. Particular requirements include smoke density, flame spread, and heat release values. In the United States, Federal Aviation Regulation (FAR) Part 25.853 sets forth the airworthiness standards for aircraft compartment interiors. The safety standards for aircraft and transportation systems used in the United States include a smoke density test specified in FAR 25.5 Appendix F, Part V Amdt 25-116. Flammability requirements include the "60 second test" specified in FAR 25.853 (a) Appendix F, Part I, (a), 1, (i) and the heat release rate standard (referred to as the OSU 65/65 standard) described in FAR F25.4 (FAR Section 25, Appendix F, Part IV), or the French flame retardant tests such as, NF-P-92-504 (flame spread) or NF-P-92-505 (drip test). In another example, the aircraft manufacturer Airbus has smoke density and other safety requirements set forth in ABD0031. In the event of a fire, components made from materials having these properties can increase the amount of time available for escape and provide for better visibility during a fire Despite extensive investigation, current materials that meet these FAR standards could be further improved with respect to other properties. Thus, there is a perceived need for polysulfones having improved melt flow, improved ultraviolet (UV) stability, and improved light transmission. Siloxane-polyestercarbonates have low melt flow and good color stability to indoor light, but may shift in color upon exposure to UV light. Certain polycarbonate-polyetherimide blends also have low melt flow, but can be difficult to formulate so as to provide bright white compositions.

In view of the current interior material safety standards, and in anticipation of more stringent standards in the future, materials that exceed governmental and aircraft manufacturer flame safety requirements are sought. Such materials should also advantageously maintain excellent physical properties, such as toughness (high impact strength and high ductility). It would be a further advantage if such materials could be manufactured to be colorless and transparent. Still other advantageous features include good processability for forming articles, smooth surface finish, and light stability, particularly UV light stability.

BRIEF SUMMARY OF THE INVENTION

Disclosed herein is a composition comprising: a first polymer comprising a poly(etherimide-siloxane) copolymer comprising (a) a repeating polyetherimide unit, and (b) a poly (siloxane) block unit, the polysiloxane block unit having the formula:

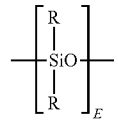

wherein R is each independently a $C_1$-$C_{30}$ hydrocarbon group, and E has an average value of 5 to 200; a second polymer different from the first polymer and comprising bromine; and a third polymer comprising a polycarbonate different from the first polymer and second polymer; wherein the wt % of the first polymer, second polymer, and optional one or more third polymers sum to 100 wt %, siloxane units are present in the composition in an amount of at least 0.3 wt %, based on the sum of the wt % of the first, second, and optional one or more third polymers, and bromine is present in the composition in an amount of at least 7.8 wt %, based on the sum of the wt % of the first, second, and optional one or more third polymers; and further wherein an article molded from the composition has an OSU integrated 2 minute heat release test value of less than 65 kW-min/m² and a peak heat release rate of less than 65 kW/m² as measured using the method of FAR F25.4, in accordance with Federal Aviation Regulation FAR 25.853 (d), and an E662 smoke test Dmax value of less than 200 when measured at a thickness of 1.6 mm.

Also described is a method of manufacture of the above-described compositions.

Articles comprising the above-described compositions are further disclosed, as well as methods for the manufacture of the articles.

The above described and other features are exemplified by the following Figures, Detailed Description, and Examples.

FIGURES

DETAILED DESCRIPTION OF THE INVENTION

Figure 1:
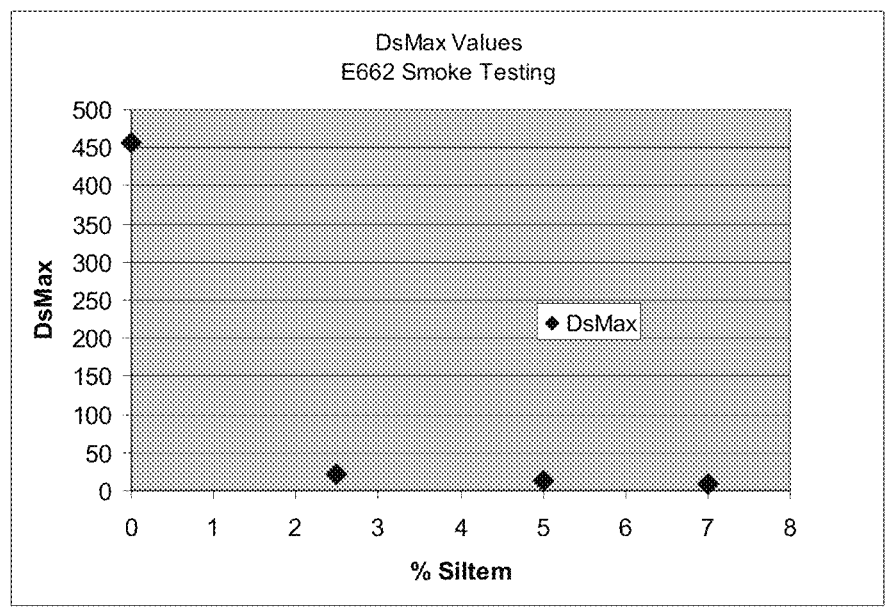
FIG. 1 is a plot showing the effect of poly(etherimide-siloxane) concentration on DsMax.

The inventors hereof have discovered that flame retardant, low smoke compositions comprising specific siloxane block copolymers can unexpectedly be obtained when certain siloxane-containing copolymer and bromine-containing compositions, neither of which meets strict low density smoke standards, are used in combination. In particular, certain polysiloxane block copolymers and certain bromine-containing compositions, do not by themselves meet strict low smoke density standards when burned. However, specific combinations of these two compositions can meet low smoke density standards, and have very low heat release properties. Achieving very low smoke density and very low flammability ratings are conflicting requirements. Halogenated, specifically brominated, flame retardants are used in poly(siloxane) copolymer compositions for their effectiveness in improving flame spread properties and satisfying the stringent aircraft and rail interior flammability standards. Brominated flame retardant additives, however, cause an increase in smoke when the sheet compositions are ignited. It is therefore surprising that a brominated flame retardant can be added to a poly(siloxane) block or graft copolymer and lower the smoke density of the poly(siloxane) copolymer.

The compositions can further have excellent mechanical properties, including at least one of high impact strength, low brittleness (high ductility) as well as favorable processing characteristics, such as low melt viscosity. In a further advantageous feature, the combinations can be transparent. In another advantageous feature, the compositions can have low density. Such compositions are especially useful in the manufacture of flame retardant, low smoke poly(siloxane) copolymer sheets that can be used, for example, in aircraft, train, marine, or other transportation applications.

The compositions contain a first polymer comprising first repeating units and blocks of repeating polysiloxane units; a brominated second polymer different from the first polymer; and optionally, one or more third polymers different from the first polymer and second polymer, wherein the weight percent (wt %) of the first polymer, second polymer, and optional one or more third polymers sum to 100 wt %, and the polysiloxane units are present in the composition in an amount of at least 0.3 wt %, based on the sum of the wt % of the first, second, and optional third polymers, and bromine is present in the composition in an amount of at least 7.8 wt %, based on the sum of the wt % of the first, second, and optional third polymers; and further wherein an article molded from the composition has an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), and an E662 smoke test Dmax value of less than 200 when measured at a thickness of 1.6 mm. For simplicity, this test can be referred to herein as the "smoke density test."

The first, second, and optionally one or more third polymers are further selected and used in amounts effective to satisfy the requirements for heat release rates described in FAR F25.4 (Federal Aviation Regulations Section 25, Appendix F, Part IV). Materials in compliance with this standard are required to have a 2-minute integrated heat release rate of less than or equal to 65 kilowatt-minutes per square meter (kW-min/m$^2$) and a peak heat release rate of less than 65 kilowatts per square meter (kW/m$^2$) determined using the Ohio State University calorimeter, abbreviated as OSU 65/65 (2 min/peak). In applications requiring a more stringent standards, where a better heat release rate performance is called for, a 2-minute integrated heat release rate of less than or equal to 55 kW-min/m$^2$ and a peak heat release rate of less than 55 kW/m$^2$ (abbreviated as OSU 55/55) may be required.

Without being bound by theory, it is believed that the unexpected combination of low smoke density and low heat release values obtained is achieved by careful selection and balancing of the absolute and relative amounts of the first polymer, the second polymer, and the optional one or more third polymers, including selecting an amount of first polymer, block size (i.e., length) of the siloxane blocks, and number of siloxane blocks such that at least 0.3 wt % polysiloxane units are present in the composition; and selecting the type and amount of the second polymer and the amount of bromine in the second polymer such that at least 7.8 wt % bromine is present in the composition. The compositions therefore include amounts of the first and second polymers effective, i.e., sufficient, to provide the desired amount of polysiloxane units and bromine, which in turn yields compositions having the an OSU-integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), and an E662 smoke test D$_{max}$ value of less than 200 when tested at a thickness of 1.6 mm.

In an embodiment, an effective amount of the siloxane-containing copolymer is at least 1 wt %, specifically 1 to 85 wt % of the siloxane-containing copolymer, and an effective amount of the brominated polymer is at least 15 wt %, specifically 15 to 95 wt %, each based on the total weight of the first polymer, second polymer, and optional one or more third polymers. The precise amount of the first polymer effective to provide at least 0.3 wt % of the polysiloxane units depends on the selected copolymer, the length of the siloxane block, the number the siloxane-containing blocks, and the desired properties, such as smoke density, heat release values, transparency, impact strength, melt viscosity, and/or other desired physical properties. In general, to be effective, when a block copolymer is used, the smaller the block size and/or the lower the number of blocks in the first polymer, the higher the fractional concentration of the first polymer, based on the total weight of the first, second and optionally one or more third polymers. When a graft copolymer is used, the lower the number of branches and/or the shorter the branches, the higher is the fractional concentration of the first polymer based on the total weight of the first, second and optionally one or more third polymers. Similarly, for the brominated polymer, the precise amount depends on the type of polymer, the amount of bromine in the polymer, and other desired characteristics of the compositions. The lower the weight percent of bromine in the second polymer, the higher the fractional concentration of the second polymer, based on the total weight of the first, second and optionally one or more third polymers. Thus, an effective amount of the siloxane-containing copolymer in some embodiments can be at least 5 wt %, specifically 5 to 80 wt %, or at least 10 wt %, specifically 10 to 70 wt %, or at least 15 wt %, specifically 15 to 60 wt %, and an effective amount of the brominated polymer in some embodiments can be at least 20 wt %, specifically 20 to 85 wt %, or 20 to 75 wt %, each based on the total weight of the first polymer, second polymer, and optional one or more third polymers.

As stated above, the first polymer comprises first repeating units and blocks of repeating polysiloxane units. In a particularly advantageous feature, the first repeating units can be a variety of different units, which allows manufacture of low smoke, low heat release compositions having a variety of properties. The first repeating units can be polycarbonate units, etherimide units, ester units, sulfone units, arylene ether units, and combinations comprising at least one of the foregoing, for example resorcinol-based aryl ester-carbonate, etherimide-sulfone, and arylene ether-sulfone.

In a specific embodiment, the first, second, and optional third polymers are polycarbonates, that is, polymers containing repeating carbonate units. Thus the first polymer is a poly(siloxane-carbonate) copolymer, the second polymer is a brominated polymer containing repeating carbonate units, and the one or more optional third polymers are polycarbonate homopolymers or copolymers. In an embodiment, the polycarbonate composition comprises at least 5 wt %, specifically 5 to 85 wt % of the first poly(siloxane-carbonate) copolymer, at least 15 wt %, specifically 15 to 95 wt % of the second brominated polycarbonate, such as a brominated polycarbonate derived from 2,2',6,6'-tetrabromo-4,4'-isopropylidenediphenol (2,2-bis(3,5-dibromo-4-hydroxyphenyl) propane (TBBPA) and carbonate units derived from at least one dihydroxy aromatic compound that is not TBBPA ("TBBPA copolymer"), and 0 to 70 wt % of the optional one or more third polymers, based on the total weight of the first, second, and optional one or more third polymers, i.e., the wt % of the first polymer, second polymer, and optional one or more third polymers sum to 100 wt %. The siloxane blocks present in the first polymer have an average of 5 to 200 units, specifically 5 to 100 units. At least 0.3 wt % siloxane and at least 7.8 wt % bromine is present, each based on total weight of the first polymer, second polymer, and optional one or more third polymers.

Further in this embodiment, when the siloxane blocks have an average of 25 to 75 units, specifically 25 to 50 units, and at least 2.0 wt % siloxane is present based on total weight of the first polymer, second polymer, and optional one or more third polymers, excellent toughness is obtained, in particular an article molded from the composition further has a room temperature notched Izod impact of greater than 500 J/m as measured according to ASTM D 256-10 at a 0.125 inch (3.2 mm) thickness. The articles can further have 100% ductility. The amount of siloxane in the composition can be varied by controlling the length of units per block, the number of blocks and the tacticity of the blocks along the backbone.

Still further in this embodiment, when the polysiloxane units of the first polymer is present in an amount of at least 2.0 wt % and the composition has 35 to 50 wt % of the second polymer (the TBBPA copolymer), each based on total weight of the first polymer, second polymer, and optional one or more third polymers, and the siloxane blocks have an average length of 25 to 50 units, excellent transparency can be obtained, in particular an article molded from this composition has a haze of less than 10% and a transmission greater than 70%, each measured using the color space CIE1931 (Illuminant C and a 2° observer), or according to ASTM D 1003 (2007) using illuminant C at a 0.125 inch (3.2 mm) thickness.

Excellent transparency can also be obtained when the polycarbonate composition comprises the first polymer in an amount effective to provide at least 0.3 wt % siloxane and the second polymer in an amount effective to provide at least 5.0 wt % bromine, each based on total weight of the first polymer, second polymer, and optional one or more third polymers, and the siloxane blocks or grafts have an average of 5 to 75, specifically 5 to 15 units. Effective amounts can be at least 30 wt %, specifically 30 to 80 wt % of the first polymer, and at least 20 wt %, specifically at least 20 to 50 wt % of the second polymer (the TBBPA copolymer), and 0 to 50 wt % of the optional one or more third polymers, each based on the total weight of the first, second, and optionally one or more third polymers. An article molded from the composition has a haze of less than 3% and a transmission greater than 85%, each measured using the color space CIE1931 (Illuminant C and a 2° observer), or according to ASTM D 1003 (2007) using illuminant C at a 0.062 inch (1.5 mm) thickness.

In still other embodiments, it has been found that limiting the amount of the optional third polymer, together with use of specific first and second polycarbonates can produce compositions with advantageous properties. In one such embodiment, the polycarbonate composition comprises the first polymer (the poly(siloxane-carbonate)), the second polymer (the TBBPA copolymer or brominated oligomer), and 8 to 12 wt % of the one or more third polymers, wherein the wt % of the first polymer, second polymer, and one or more third polymers sum to 100 wt % based on the total weight of the first, second and optionally one or more third polymers. The siloxane blocks have an average value of 20 to 85 units. At least 0.4 wt % of siloxane and at least 7.8 wt % of bromine is present, each based on total weight of the first polymer, second polymer, and one or more third polymers. In an embodiment, the polycarbonate composition comprises 5 to 60 wt % of the first poly(siloxane-carbonate) 30 to 60 wt % of the second polymer (the TBBPA copolymer).

In an alternative embodiment of the polycarbonate compositions, it has been found that other brominated oligomers can be used in place of the TBBPA copolymer, such as other brominated polycarbonate oligomers or brominated epoxy oligomers. In this embodiment, the polycarbonate compositions contain the first poly(siloxane-carbonate), a brominated oligomer, and an optional additional polycarbonate different from the first polymer and the brominated oligomer. The optional additional polycarbonate can be the same as the optional one or more third polymers described in the above embodiments. The first polymer, the brominated oligomer, and the optional additional polycarbonate are present in amounts effective to provide at least 0.3, or 0.4 wt % of siloxane and at least 7.8 wt % of bromine, each based on total weight of the first polymer, brominated oligomer, and additional polycarbonate, and thus satisfy at least the smoke density test and the heat release OSU 65/65 test. In particular, the polycarbonate compositions comprise at least 5 wt %, specifically 5 to 85 wt % of the first poly(siloxane-carbonate), at least 15 wt %, specifically at least 15 to 95 wt % of the brominated oligomer, and 0 to 60 wt % of the optional additional polycarbonate, each based on the total weight of the first polymer, brominated oligomer, and optional additional polycarbonate. The siloxane blocks have an average of 5 to 100 units.

In still other embodiments, the first polymer is a poly (siloxane-etherimide) copolymer, the second polymer is a brominated polymer, and the optional third polymer is present, and is a polycarbonate. In an embodiment, an effective amount of the poly(siloxane-etherimide) copolymer is at least 5 wt %, specifically 5 to 85 wt %, and an effective amount of the brominated polymer is at least 15 wt %, specifically 15 to 95 wt %, each based on the total weight of the first polymer, second polymer, and third polymer. The precise amount of the poly(siloxane-etherimide) copolymer effective to provide at least 0.3 wt % of the polysiloxane units depends on the selected copolymer, the length of the siloxane block, the number the siloxane-containing blocks, and the desired properties, such as smoke density, heat release values, transparency, impact strength, melt viscosity, and/or other desired physical properties. In general, to be effective, when a block copolymer is used, the smaller the block size and/or the lower the number of blocks in the first polymer, the higher the fractional concentration of the first polymer, based on the total weight of the first, second and optionally one or more third polymers. When a graft copolymer is used, the lower the number of branches and/or the shorter the branches, the higher is the fractional concentration of the first polymer based on the total weight of the first, second and optionally one or more third polymers. Similarly, for the brominated polymer, the precise amount depends on the type of polymer, the amount of bromine in the polymer, and other desired characteristics of the compositions. The lower the weight percent of bromine in the second polymer, the higher the fractional concentration of the second polymer, based on the total weight of the first, second and optionally one or more third polymers.

While the smoke density and OSU tests demonstrate the ability of the poly(siloxane) copolymer compositions, for example the poly(siloxane-etherimide) copolymer compositions, described herein to comply with both the smoke generation and heat release requirements for transportation components, particularly aircraft or train interiors, any of the above-described compositions can advantageously comply with other related flammability and safety tests as described above.

In certain embodiments, the first, second, and optional one or more third polymers, as well as the brominated polycarbonates (including the TBBPA copolymer and brominated polycarbonate oligomers) have repeating structural carbonate units of formula (1):

wherein at least 60%, specifically at least 80%, and specifically at least 90% of the total number of $R^1$ groups contains aromatic organic groups and the balance thereof are aliphatic or alicyclic groups. In particular, use of aliphatic groups is minimized in order to maintain the flammability performance of the polycarbonates. In an embodiment, at least 70%, at least 80%, or 95 to 100% of the $R^1$ groups are aromatic groups. In an embodiment, each $R^1$ is a divalent aromatic group, for example derived from an aromatic dihydroxy compound of formula (2):

$$\text{HO-A}^1\text{-Y}^1\text{-A}^2\text{-OH} \tag{2}$$

wherein each of $A^1$ and $A^2$ is independently a monocyclic divalent arylene group, and $Y^1$ is a single bond or a bridging group having one or two atoms that separate $A^1$ from $A^2$. In an embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group, specifically a saturated hydrocarbon group such as methylene, cyclohexylidene, or isopropylidene.

Included within the scope of formula (2) are bisphenol compounds of formula (3):

wherein each of $R^a$ and $R^b$ is independently a halogen atom or a monovalent hydrocarbon group; p and q are each independently integers of 0 to 4; and $X^a$ represents a single bond or one of the groups of formulas (4) or (5):

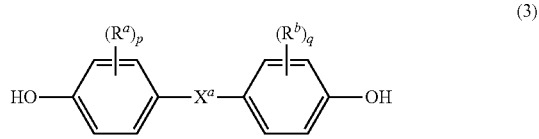

wherein each $R^c$ and $R^d$ is independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl, specifically the same $C_{1-3}$ alkyl, even more specifically, methyl.

In an embodiment, $R^c$ and $R^d$ taken together is a $C_{3-20}$ cyclic alkylene or a heteroatom-containing $C_{3-20}$ cyclic alkylene comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Heteroatoms in the heteroatom-containing cyclic alkylene group include —O—, —S—, and —N(Z)—, where Z is a substituent selected from hydrogen, hydroxy, $C_{1-12}$ alkyl, $C_{1-12}$ alkoxy, or $C_{1-12}$ acyl.

In a specific embodiment, $X^a$ is a substituted $C_{3-18}$ cycloalkylidene of formula (6):

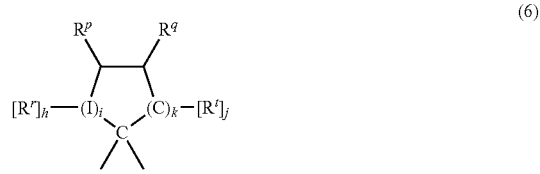

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

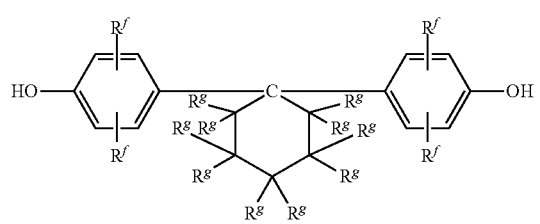

wherein $R^f$ is each independently hydrogen, $C_{1-12}$ alkyl, or halogen; and $R^g$ is each independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures ($T_g$) and high heat distortion temperatures (HDT). Cyclohexyl bisphenol-containing polycarbonates, or a combination comprising at least one of the foregoing with other bisphenol polycarbonates, are supplied by Bayer Co. under the APEC® trade name.

Other useful dihydroxy compounds having the formula $HO-R^1-OH$ include aromatic dihydroxy compounds of formula (8):

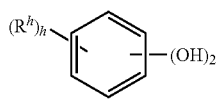

(8)

wherein $R^h$ is each independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and h is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis (4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like; catechol; hydroquinone; and substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like. Combinations comprising at least one of the foregoing dihydroxy compounds can be used.

Specific examples of bisphenol compounds that can be represented by formula (3) include 1,1-bis(4-hydroxyphenyl) methane, 1,1-bis(4-hydroxyphenyl)ethane, 2,2-bis(4-hydroxyphenyl)propane (bisphenol A or BPA), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis (4-hydroxy-t-butylphenyl) propane, 3,3-bis(4-hydroxyphenyl)phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate ("copolycarbonates"), and copolymers comprising carbonate units and other types of polymer units, such as polysiloxane units or ester units. In a specific embodiment, the one or more optional third polymers is a linear homopolymer or copolymer comprising units derived from bisphenol A, in which each of $A^1$ and $A^2$ is p-phenylene and $Y^1$ is isopropylidene in formula (2). More specifically, at least 60%, particularly at least 80% of the $R^1$ groups in the polycarbonate homopolymer or copolymer are derived from bisphenol A. In an embodiment, the first polymer is a block or graft copolymer comprising carbonate units of formula (1) and blocks of polysiloxane units, i.e., a poly(siloxane-co-carbonate), referred to herein as a "poly(siloxane-carbonate)." Block poly(siloxane-carbonate) copolymers comprise siloxane blocks and carbonate blocks in the polymer backbone. Graft poly(siloxane-carbonate) copolymers are non-linear copolymers comprising the siloxane blocks connected to linear or branch polymer backbone comprising carbonate blocks.

In addition to the first repeating units in the first polymer (for example polycarbonate units (1) as described above), the first polymer comprises blocks of polysiloxane units of formula (9):

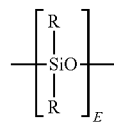

(9)

wherein R is each independently a $C_1$-$C_{30}$ hydrocarbon group, specifically a $C_{1-13}$ alkyl group, $C_{2-13}$ alkenyl group, $C_{3-6}$ cycloalkyl group, $C_{6-14}$ aryl group, $C_{7-13}$ arylalkyl group, or $C_{7-13}$ alkylaryl group. The foregoing groups can be fully or partially halogenated with fluorine, chlorine, bromine, or iodine, or a combination comprising at least one of the foregoing. Combinations of the foregoing R groups can be used in the same copolymer. In an embodiment, the polysiloxane comprises R groups that have minimum hydrocarbon content. In yet another embodiment, the foregoing R groups are functionalized wherein at least one methyl group has been replaced by another group, which is preferably not hydrogen, or wherein the functionalized R groups incorporate reactive functional groups such as anhydrides and epoxides that can react with other components by, for example, covalent bonding. In a specific embodiment, R is each the same and is a methyl group.

The average value of E in formula (9) can vary from 5 to 200. In an embodiment, E has an average value of 5 to 100, 10 to 100, 10 to 50, 25 to 50, or 35 to 50. In another embodiment, E has an average value of 5 to 75, specifically 5 to 15, specifically 5 to 12, more specifically 7 to 12. The siloxane blocks can be atactic, isotactic, or syndiotactic. In an embodiment, the tacticity of the siloxane can affect the effective amount of each copolymer used. The siloxane containing copolymer can be a graft copolymer wherein the siloxane-containing blocks are branched from a polymer backbone having blocks of the first repeating units, for example carbonate units of formula (1).

In an embodiment, for example in poly(siloxane-carbonates), the polysiloxane units can be derived from polysiloxane bisphenols of formula (10) or (11):

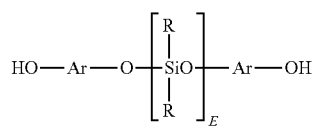

(10)

-continued

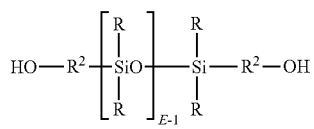

(11)

wherein E is as defined in formula (9); each R can be the same or different, and is as defined in formula (9); each Ar can be the same or different, and is a substituted or unsubstituted $C_{6-30}$ arylene group; and each $R^2$ is the same or different, and is a divalent $C_{1-30}$ alkylene or $C_{7-30}$ arylenealkylene wherein the bonds of the hydroxyl groups are directly bonded to the arylene moiety or the alkylene moiety.

The Ar groups in formula (10) can be derived from a $C_{6-30}$ dihydroxy aromatic compound, for example a dihydroxy aromatic compound of formula (2), (3), (6), (7), or (8) above. Combinations comprising at least one of the foregoing dihydroxy aromatic compounds can also be used. Illustrative examples of dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is not substituted with non-aromatic hydrocarbon-containing substituents such as alkyl, alkoxy, or alkylene substituents.

In a specific embodiment, where Ar is derived from resorcinol, the polydiorganosiloxane repeating units are derived from polysiloxane bisphenols of formula (12):

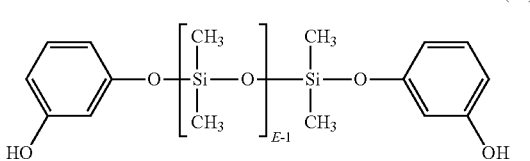

(12)

or, where Ar is derived from bisphenol A, from polysiloxane bisphenols of formula (13):

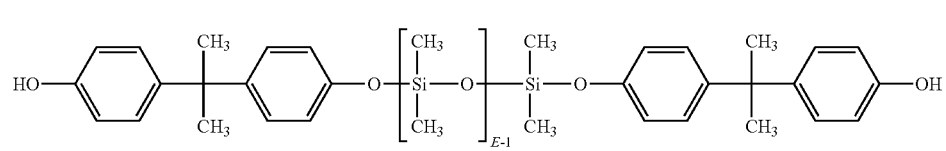

(13)

wherein E is as defined above.

Where $R^2$ is $C_{7-30}$ arylenealkylene in formula (11), the polysiloxane units can be derived from polysiloxane bisphenols of formula (14):

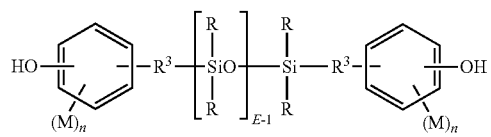

(14)

wherein R and E are as defined in formula (9). $R^3$ is each independently a divalent $C_{2-8}$ aliphatic group. Each M can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polysiloxane units are derived from a polysiloxane bisphenol of formula (15):

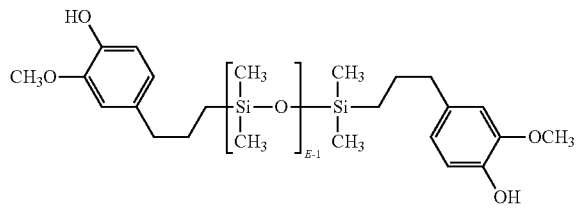

(15)

wherein E is as described in formula (9).

In another specific embodiment, the polysiloxane units are derived from polysiloxane bisphenol of formula (16):

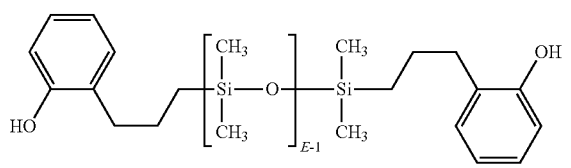

(16)

wherein E is as described in formula (9).

The relative amount of carbonate and polysiloxane units in the poly(siloxane-carbonate) will depend on the desired properties, and are carefully selected using the guidelines provided herein. In particular, as mentioned above, the block or graft poly(siloxane-carbonate) copolymer is selected to have a certain average value of E, and is selected and used in amount effective to provide the desired wt % of polysiloxane units in the composition. In an embodiment, the poly(siloxane-carbonate) can comprise polysiloxane units in an amount of 0.3 to 30 weight percent (wt %), specifically 0.5 to 25 wt %, or 0.5 to 15 wt %, or even more specifically 0.7 to 8 wt %, or 0.7 to 7 wt %, based on the total weight of the poly(siloxane-carbonate), with remainder being carbonate units.

In an embodiment, the poly(siloxane-carbonate) comprises units derived from polysiloxane bisphenols (14) as described above, specifically wherein M is methoxy, n is 0 or 1, $R^3$ is a divalent $C_{1-3}$ aliphatic group, and R is methyl, still more specifically a polysiloxane bisphenol of formula (15) or (16). In these embodiments, E can have an average value of 8 to 100, wherein the polysiloxane units are present in an amount of 0.3 to 25 wt % based on the total weight of the poly(siloxane-carbonate); or, in other embodiments, E can have an average value of 25 to 100, wherein the polysiloxane units are present in an amount of 5 to 30 wt % based on the total weight of the poly(siloxane-carbonate); or E can have an average value of 30 to 50, or 40 to 50, wherein the polysiloxane units are present in an amount of 4 to 8 wt % based on the total weight of the poly(siloxane-carbonate); or E can have an average value of 5 to 12, wherein the polysiloxane units are present in an amount of 0.5 to 7 wt % based on the total weight of the poly(siloxane-carbonate).

In another embodiment, the first polymer is a poly(siloxane-etherimide) copolymer comprising siloxane blocks (9) and polyetherimide units of formula (17):

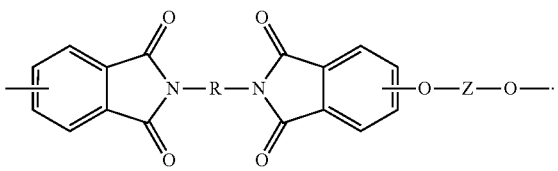

(17)

In this embodiment, the first polymer is a block or graft copolymer comprising etherimide units of formula (17) and blocks of polysiloxane units, i.e., a poly(siloxane-co-etherimide), referred to herein as a "(polyetherimide-siloxane)." Block poly(siloxane-etherimide) copolymers comprise siloxane blocks and etherimide blocks in the polymer backbone. The siloxane blocks and the polyetherimide units can be present in random order, as blocks (i.e., AABB), alternating (i.e., ABAB), or a combination thereof. Graft poly(siloxane-etherimide) copolymers are non-linear copolymers comprising the siloxane blocks connected to linear or branch polymer backbone comprising etherimide blocks.

The group R in formula (17) is a divalent hydrocarbon group, such as a $C_{6-20}$ aromatic hydrocarbon group or halogenated derivative thereof, a straight or branched chain $C_{2-20}$ alkylene group or halogenated derivative thereof, a $C_{3-20}$ cycloalkylene group or halogenated derivative thereof, or a divalent group of formula (18):

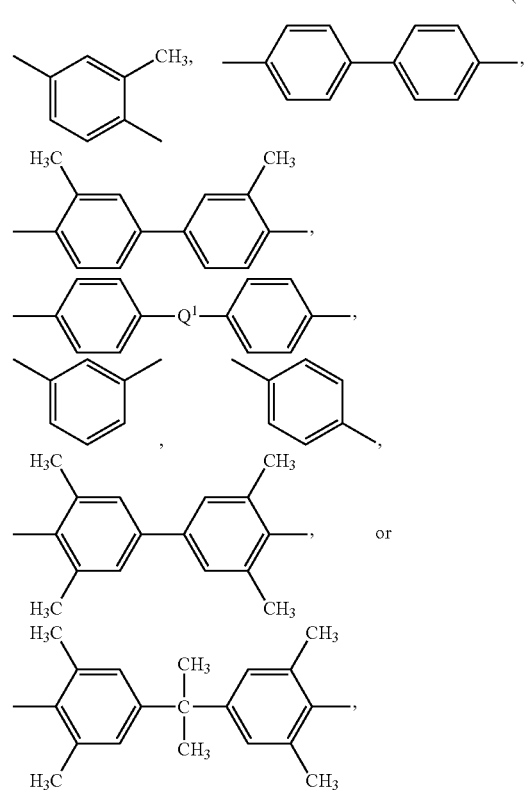

(18)

wherein $Q^1$ is —O—, —S—, —C(O)—, —SO$_2$—, —SO—, and —C$_y$H$_{2y}$— and a halogenated derivative thereof (which includes perfluoroalkylene groups) wherein y is an integer from 1 to 5. In a specific embodiment R is a m-phenylene or p-phenylene.

The group Z in formula (17) is also a substituted or unsubstituted divalent hydrocarbon group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (3). A specific example of a group Z is a divalent group of formula (19)

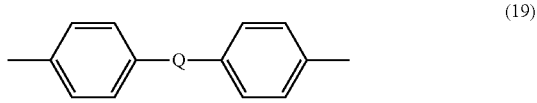

(19)

wherein Q is —O—, —S—, —C(O)—, —SO$_2$—, —SO—, and —$C_yH_{2y}$— and a halogenated derivative thereof (including a perfluoroalkylene group) wherein y is an integer from 1 to 5. In a specific embodiment Z is derived from bisphenol A wherein Q is 2,2-isopropylidene.

More specifically, the first polymer comprises blocks of 2 to 1,000, 2 to 500, or 5 to 100 structural units of formula (17) wherein R is a divalent group of formula (19) wherein $Q^1$ is —$C_yH_{2y}$— wherein y is an integer from 1 to 5 or a halogenated derivative thereof, and Z is a group of formula (19). In a specific embodiment, R is m-phenylene, p-arylene diphenylsulfone, or a combination thereof, and Z is 2,2-(4-phenylene)isopropylidene.

As is known, polyetherimides can be obtained by polymerization of an aromatic bisanhydride of the formula (20):

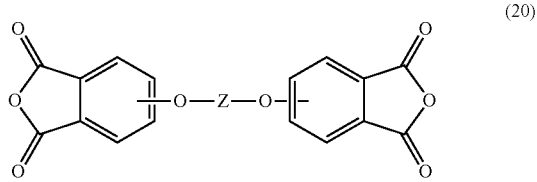

(20)

wherein Z is as described in formula (17), with a diamine of the formula (21):

H$_2$N—R—NH$_2$ (21)

wherein R is as described in formula (17). Illustrative examples of the aromatic bisanhydrides (20) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy) diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride. Combinations comprising at least one of the foregoing aromatic bisanhydrides (20) can be used.

Illustrative examples of diamines (21) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl) sulfone, bis(4-aminophenyl)ether and 1,3-bis(3-aminopropyl)tetramethyldisiloxane. Combinations comprising at least one of the foregoing aromatic bisanhydrides can be used. Aromatic diamines are often used, especially m- and p-phenylenediamine, sulfonyl dianiline and combinations thereof.

The poly(siloxane-etherimide)s can be formed by polymerization of an aromatic bisanhydride (20) and a diamine component comprising an organic diamine (21) or mixture of diamines (21), and a polysiloxane diamine of the formula (22):

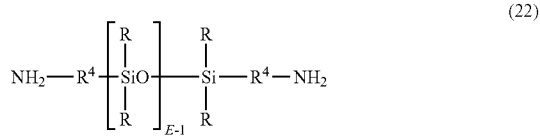

(22)

wherein R and E are as described in formula (9), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40. Procedures for making the polysiloxane diamines of formula (22) are well known in the art. For example, an aminoorganotetraorganodisiloxane can be equilibrated with an octaorganocyclotetrasiloxane, such as octamethylcyclotetrasiloxane, to increase the block length of the polydiorganosiloxane.

In some poly(siloxane-etherimide)s the diamine component can contain 10 to 90 mole percent (mol %), or 20 to 50 mol %, or 25 to 40 mol % of polysiloxane diamine (22) and 10 to 90 mol %, or 50 to 80 mol %, or 60 to 75 mol % of diamine (21), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (21) and (22) with aromatic dianhydrides (20), to make polyimide blocks that are subsequently reacted together. Thus, the poly (siloxane-imide) copolymer can be a block, random, or graft copolymer.

In an embodiment, the poly(siloxane-etherimide) is made by sequentially intercondensing at temperatures in the range of 100° C. to 300° C., the polysiloxane diamine (22) and the diamine (21) with aromatic bisanhydride (20). A substantially inert organic solvent can be used to facilitate intercondensation, for example, dipolar aprotic solvents such as dimethylformamide, N-methyl-2-pyrrolidone, cresol, orthodichlorobenzene, and the like. A polymerization catalyst can be used at 0.025 to 1.0% by weight, based on the weight of the reaction mixture, such as an alkali metal aryl phosphinate or alkali metal aryl phosphonate, for example, sodium phenylphosphinate.

The sequential intercondensation of the polysiloxane diamine (22) and the diamine (21) with the aromatic bisanhydride (20) can be achieved in either a single container or in multiple containers. In the "single pot" procedure, an off stoichiometric amount of either the polysiloxane diamine (22) or the diamine (21), is intercondensed with the aromatic bisanhydride (20) in the presence of an inert organic solvent to produce a mixture of polyimide oligomer chain stopped with either intercondensed diamine or aromatic bisanhydride. An excess of aromatic bisanhydride (2) or diamine (21) corresponding to the chain stopping units also can be present. The oligomer can be either a silicone polyimide, or an oligomer of intercondensed aromatic bisanhydride and diamine. There is then added to the same pot, after the initial period of oligomer formation, the remaining diamine, which can be either the polysiloxane diamine (22) or the diamine (21) and optionally sufficient aromatic bisanhydride (20) to achieve stoichiometry. There also can be added to the resulting intercondensation mixture, chain stoppers, such a phthalic anhydride or monofunctional arylamine such as aniline to control the molecular weight of the final poly(siloxane-etherimide). In the multiple pot procedure, diamine oligomer and polysiloxane diamine oligomer can be intercondensed with aromatic bisanhydride in separate containers. The multiple pot procedure can achieve satisfactory results in instances where two or more oligomers are required providing a substantially stoichiometric balance maintained between total aromatic bisanhydride and diamine.

Oligomer block size can vary depending upon the proportions of polysiloxane diamine (22) and the diamine (21) used, per mole of aromatic bisanhydride (20). For example, for a "three block," oligomer, a 4/3 ratio can be used, i.e. 4 moles of diamine for 3 moles of bisanhydride. Reaction can continue until the intercondensation of anhydride and amine functional groups are achieved and the water of reaction is completely removed, such as by azeotroping from the reaction mixture.

Examples of specific poly(siloxane-etherimide) are described in U.S. Pat. Nos. 4,404,350, 4,808,686 and 4,690, 997. In an embodiment, the poly(siloxane-etherimide) has units of formula (23)

wherein E is as in formula (9), R and Z are as in formula (17), $R^4$ is as in formula (22), and n is an integer from 5 to 100.

It is also possible to incorporate polysiloxane units into a poly(siloxane-etherimide) by reaction of diamine (21) with an anhydride component comprising aromatic anhydride (20) and a polysiloxane dianhydride of formula (24), a siloxane dianhydride of formula (25), or a combination thereof:

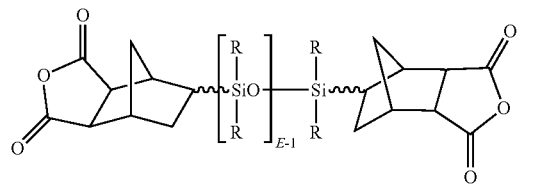

(24)

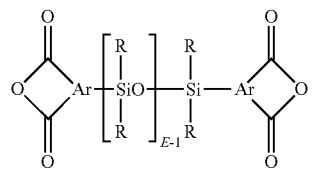

(25)

wherein R and E are as described in formula (9) and each Ar is independently a $C_6$-$C_{30}$ aromatic group. In some poly(siloxane-etherimide)s the dianhydride component can contain 20 to 50 mole percent (mol %), or 25 to 40 mol % of polysiloxane dianhydride (24) and/or (25) and about 50 to 80 mol %, or 60 to 75 mol % of dianhydride (20), for example as described in U.S. Pat. No. 4,404,350. The anhydride components can be physically mixed prior to reaction with the diamine(s), thus forming a substantially random copolymer. Alternatively, block or alternating copolymers can be formed by selective reaction of anhydrides (20) and (24) and/or (25) with diamine (21), to make polyimide blocks that are subsequently reacted together.

The relative amount of polysiloxane units and etherimide units in the poly(siloxane-etherimide) depends on the desired properties, and are carefully selected using the guidelines provided herein. In particular, as mentioned above, the block or graft poly(siloxane-etherimide) copolymer is selected to have a certain average value of E, and is selected and used in amount effective to provide the desired wt % of polysiloxane units in the composition. In an embodiment the poly(siloxane-etherimide) comprises 10 to 50 wt %, 10 to 40 wt %, or 20 to 35 wt % polysiloxane units, based on the total weight of the poly(siloxane-etherimide).

Other poly(siloxane) copolymers include poly(siloxane-sulfone) copolymers such as poly(siloxane-arylene sulfone)s and poly(siloxane-arylene ether sulfone)s wherein the first repeating units are units of formula (26):

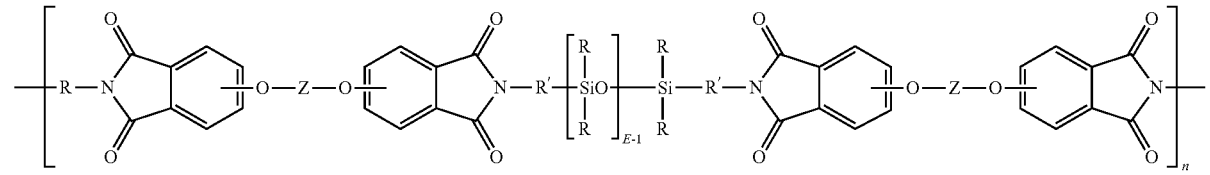

(23)

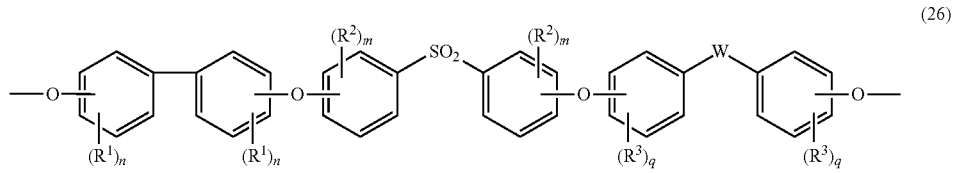

(26)

wherein $R^1$, $R^2$, and $R^3$ are each independently a halogen atom, a nitro group, a cyano group, a $C_{1-12}$ aliphatic radical, $C_{3-12}$ cycloaliphatic radical, or a $C_{3-12}$ aromatic radical; n, m, q are each independently 0 to 4; and W is a $C_{3-20}$ cycloaliphatic radical or a $C_3$-$C_{20}$ aromatic radical. In an embodiment, the first units (26) contain at least 5 mol % of aromatic ether units of formula (27)

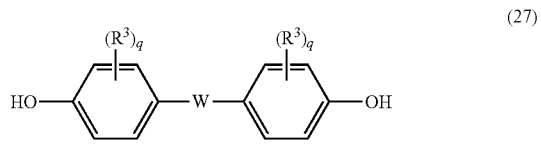

(27)

wherein $R^3$ and W are as defined in formula (26). In an embodiment, n, m, and q are each 0 and W is isopropylidene. These poly(siloxane-sulfone)s may be made by reaction of arylene sulfone-containing, arylene ether-containing, or arylene ether sulfone-containing oligomers with functionalized polysiloxanes to form random or block copolymers. Examples of the poly(siloxane-sulfone)s and their manufacture, in particular poly(siloxane-arylene sulfone)s and poly(siloxane-arylene ether sulfone)s, are disclosed in U.S. Pat. Nos. 4,443,581, 3,539,657, 3,539,655, and 3,539,655.

The relative amount of polysiloxane units and arylene sulfone units or arylene ether sulfone units in the poly(siloxane-sulfone) copolymers depends on the desired properties, and are carefully selected using the guidelines provided herein. In particular, the block or graft poly(siloxane-sulfone) is selected and used in amount effective to provide the desired wt % of polysiloxane units in the composition. In an embodiment the poly(siloxane-sulfone) copolymer comprises 10 to 50 wt %, 10 to 35 wt %, or 10 to 30 wt % polysiloxane units, based on the total weight of the poly(siloxane-arylene ether sulfone).

Other poly(siloxane) copolymers include poly(siloxane-arylene ether)s wherein the first repeating units are blocks of units of formula (28):

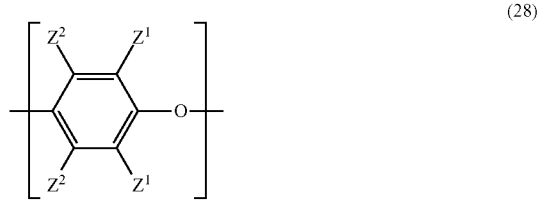

(28)

wherein $Z^1$ is each independently halogen or $C_1$-$C_{12}$ hydrocarbon group with the proviso that that the hydrocarbon group is not tertiary hydrocarbon group; and $Z^2$ is each independently hydrogen, halogen, or $C_1$-$C_{12}$ hydrocarbon group with the proviso that that the hydrocarbon group is not tertiary hydrocarbyl. In an embodiment, $Z^2$ is hydrogen and $Z^1$ is methyl.

Poly(siloxane-arylene ether)s and methods for the manufacture of poly(siloxane-arylene ether)s have been described in U.S. Pat. No. 5,204,438, which is based on the conversion of phenol-siloxane macromers to a silicone polyphenylene ether graft copolymer; and in U.S. Pat. No. 4,814,392. U.S. Pat. No. 5,596,048 discloses reaction of a polyarylene ether with a hydroxyaromatic terminated siloxane in the presence of an oxidant.

The relative amount of polysiloxane units and arylene ether units in the poly(siloxane-arylene ether) depends on the desired properties, and are carefully selected using the guidelines provided herein. In particular, the block or graft poly(siloxane-arylene ether) copolymer is selected and used in amount effective to provide the desired wt % of polysiloxane units in the composition. In an embodiment the poly(siloxane-arylene ether) comprises 1 to 80 wt %, 5 to 50 wt %, 10 to 35 wt %, or 10 to 30 wt % polysiloxane units, based on the total weight of the poly(siloxane-arylene ether).

Other poly(siloxane) copolymers include poly(siloxane-arylene ether ketone)s wherein the first repeating units are units of formula (29):

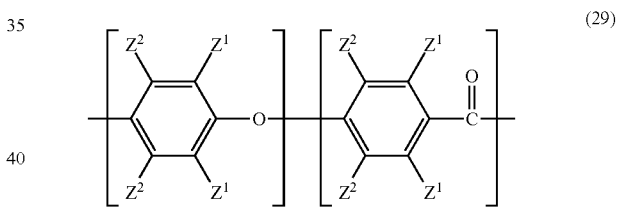

(29)

wherein $Z^1$ is each independently halogen or $C_1$-$C_{12}$ hydrocarbon group with the proviso that that the hydrocarbon group is not tertiary hydrocarbon group; and $Z^2$ is each independently hydrogen, halogen, or $C_1$-$C_{12}$ hydrocarbon group with the proviso that that the hydrocarbon group is not tertiary hydrocarbyl. In an embodiment $Z^2$ and $Z^1$ are hydrogen. The arylene ether units and arylene ketone units can be present in random order, as blocks (i.e., AABB, or alternating (i.e., ABAB), or a combination thereof.

The relative amount of polysiloxane units and arylene ether ketone units in the poly(siloxane-arylene ether ketone) depends on the desired properties, and are carefully selected using the guidelines provided herein. In particular, the block or graft poly(siloxane-arylene ether ketone) copolymer is selected and used in amount effective to provide the desired wt % of polysiloxane units in the composition. In an embodiment the poly(siloxane-arylene ether ketone) comprises 5 to 50 wt %, 10 to 35 wt %, or 10 to 30 wt % polysiloxane units, based on the total weight of the poly(siloxane-arylene ether ketone).

Poly(siloxane-esters), including poly(siloxane-ester-carbonate) copolymers can be used provided that the ester units are selected so as to not significantly adversely affect the desired properties of the poly(siloxane) copolymer compositions, for example the poly(siloxane-etherimide) copolymer compositions, in particular low smoke density and low heat release, as well as other properties such as stability to UV light. For example, aromatic ester units can diminish color stability of the poly(siloxane) copolymer compositions, for example the poly(siloxane-etherimide) copolymer compositions, during processing and when exposed to UV light. Aromatic ester units can also decrease the melt flow of the polycarbonate composition. On the other hand, the presence of aliphatic ester units can diminish the heat release values. In an embodiment the poly(siloxane-esters), including poly(siloxane-ester-carbonate) copolymers comprise 10 to 50 wt %, 10 to 35 wt %, or 10 to 30 wt % polysiloxane units The first repeating units in the poly(siloxane-esters) or poly(siloxane-ester-carbonate)s further contain, in addition to the siloxane blocks of formula (9), repeating units of formula (29):

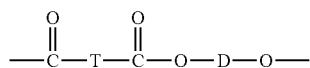
(29)

wherein D is a divalent group derived from a dihydroxy compound, and can be, for example, a $C_{2-10}$ alkylene group, a $C_{6-20}$ alicyclic group, a $C_{6-20}$ aryl, or a polyoxyalkylene group in which the alkylene groups contain 2 to 6 carbon atoms, specifically 2, 3, or 4 carbon atoms. In an embodiment, D is a $C_{2-30}$ alkylene having a straight chain, branched chain, or cyclic (including polycyclic) structure. In another embodiment, D is derived from an aromatic dihydroxy compound of formula (3), an aromatic dihydroxy compound of formula (8), or a combination thereof. T in formula (29) is a divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group. Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations comprising at least one of the foregoing. A specific dicarboxylic acid comprises a combination of isophthalic acid and terephthalic acid wherein the weight ratio of isophthalic acid to terephthalic acid is 100:0 to 0:100, or 99:1 to 1:99, or 91:9 to 2:98.

In another specific embodiment, D is a $C_{2-6}$ alkylene and T is p-phenylene, m-phenylene, naphthalene, a divalent cycloaliphatic group, or a combination comprising at least one of the foregoing. Alternatively, the ester unit can be an arylate ester unit derived from the reaction of an aromatic dihydroxy compound of formula (8) (e.g., resorcinol) with a combination of isophthalic and terephthalic diacids (or derivatives thereof). In another specific embodiment, the ester unit is derived from the reaction of bisphenol A with a combination of isophthalic and terephthalic acid. A specific poly(siloxane-ester-carbonate) comprises siloxane blocks (9), ester units derived from resorcinol and isophthalic and/or terephthalic diacids, and carbonate units (1) derived from resorcinol, bisphenol A, or a combination of resorcinol and bisphenol A in a molar ratio of resorcinol carbonate units to bisphenol A carbonate units of 1:99 to 99:1, specifically 20:80 to 80:20. The molar ratio of ester units to carbonate units in these copolymers can vary broadly, for example 1:99 to 99:1, specifically 10:90 to 90:10, more specifically 25:75 to 75:25, depending on the desired properties of the final composition. Poly(siloxane-ester-carbonate)s of this type can include siloxane blocks (9), and blocks comprising 50 to 99 mol % arylate ester units (e.g., resorcinol ester units) and 1 to 50 mol % aromatic carbonate units including resorcinol carbonate units and optionally bisphenol A carbonate units. Such copolymers are described in U.S. Pat. No. 7,605,221.

Any of the foregoing poly(siloxane) copolymers, for example the poly(siloxane-etherimide) copolymers, can have an Mw of 5,000 to 250,000, specifically 10,000 to 200,000 grams per mole (Daltons), even more specifically 15,000 to 100,000 Daltons, as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min.

Melt volume flow rate (often abbreviated "MVR") measures the rate of extrusion of a poly(siloxane) copolymer through an orifice at a prescribed temperature and load. The foregoing poly(siloxane) copolymers, for example the poly(siloxane-etherimide) copolymers, can have an MVR, measured at 300° C. under a load of 1.2 kg, of 0.1 to 200 cubic centimeters per 10 minutes ($cm^3/10$ min), specifically 1 to 100 $cm^3/10$ min.

In some embodiments a combination of two or more different poly(siloxane) copolymers are used to obtain the desired properties. The poly(siloxane) copolymers can differ in one or more of a property (e.g., polydispersity or molecular weight) or a structural feature (e.g., the value of E, the number of blocks of E, or the identity of the first repeating unit). For example, a poly(siloxane-carbonate) having a relatively lower weight percent (e.g., 3 to 10 wt %, or 6 wt %) of relatively longer length (E having an average value of 30-60) can provide a composition of lower colorability, whereas a poly(siloxane-carbonate) having a relatively higher weight percent of siloxane units (e.g., 15 to 25 wt %, or 20 wt %) of the same length siloxane units, can provide better impact properties. Use of a combination of these two poly(siloxane-carbonate)s can provide a composition having both good colorability and impact properties. Similarly, a poly(siloxane-carbonate) can be used with a poly(siloxane-etherimide) to improve impact.

The first polymer, i.e., the poly(siloxane) copolymer, is used with a second brominated polymer, wherein the type and amount of the brominated polymer is selected so as to provide at least 7.8 wt. % bromine to the composition as described above. As used herein, a "brominated polymer" is inclusive of homopolymers and copolymers, and includes molecules having at least 2, at least 5, at least 10, or at least 20 repeat units with bromine substitution, and an Mw of at least 1,000 Daltons, for example 1, 000 to 50,000 Daltons.

In certain embodiments, the second polymer is a specific brominated polycarbonate, i.e., a polycarbonate containing brominated carbonate units derived from 2,2',6,6'-tetrabromo-4,4'-isopropylidenediphenol (TBBPA) and carbonate units derived from at least one dihydroxy aromatic compound that is not TBBPA. The dihydroxy aromatic compound can be one of formula (5), (6), (7), (8), (9), or (10). In a specific embodiment the dihydroxy aromatic compound is of formula (5), more specifically dihydroxy aromatic compound (5) containing no additional halogen atoms. In an embodiment, the dihydroxy aromatic compound is Bisphenol A.

The relative ratio of TBBPA to the dihydroxy aromatic compound used to manufacture the TBBPA copolymer will depend in some embodiments on the amount of the TBBPA copolymer used and the amount of bromine desired in the polycarbonate composition. In an embodiment, the TBBPA copolymer is manufactured from a composition having 30 to 70 wt % of TBBPA and 30 to 70 wt % of the dihydroxy aromatic compound, specifically Bisphenol A, or specifically 45 to 55 wt % of TBBPA and 45 to 55 wt % of the dihydroxy aromatic compound, specifically bisphenol A. In an embodiment, no other monomers are present in the TBBPA copolymer.

Combinations of different TBBPA copolymers can be used. Specifically, a TBBPA copolymer can be used having phenol endcaps. Also specifically, a TBBPA carbonate can be used having 2,4,6-tribromophenol endcaps can be used.

The TBBPA copolymers can have an Mw from 18,000 to 30,000 Daltons, specifically 20,000 to 30,000 Daltons as measured by gel permeation chromatography (GPC) using polycarbonate standards.

Alternatively, the poly(siloxane) copolymer is used with a brominated oligomer. Thus, instead of a TBBPA copolymer as the second polymer in certain embodiments, a brominated oligomer having an Mw of 18,000 Daltons or less is used. The term "brominated oligomer" is used herein for convenience to identify a brominated compound comprising at least two repeat units with bromine substitution, and having an Mw of less than 18,000 Daltons. The brominated oligomer can have an Mw of 1000 to 18,000 Daltons, specifically 2,000 to 15,000 Daltons, and more specifically 3,000 to 12,000 Daltons.

In certain embodiments the brominated oligomer has a bromine content of 40 to 60 wt %, specifically 45 to 55 wt %, more specifically 50 to 55 wt %. The specific brominated oligomer and the amount of brominated oligomer are selected to provide at least 7.8 wt % bromine, specifically 7.8 to 14 wt % bromine, more specifically 8 to 12 wt % bromine, each based on the total weight of first polymer, the brominated oligomer, and the optional additional polycarbonate.

The brominated oligomer can be a brominated polycarbonate oligomer derived from brominated aromatic dihydroxy compounds (e.g., brominated compounds of formula (1)) and a carbonate precursor, or from a combination of brominated and non-brominated aromatic dihydroxy compounds, e.g., of formula (1), and a carbonate precursor. Brominated polycarbonate oligomers are disclosed, for example, in U.S. Pat. Nos. 4,923,933, 4,170,711, and 3,929,908. Examples of brominated aromatic dihydroxy compounds include 2,2-bis(3,5-dibromo-4-hydroxyphenyl)propane, bis(3,5-dibromo-4-hydroxyphenyl)menthanone, and 2,2',6,6'-tetramethyl-3,3',5,5'-tetrabromo-4,4'-biphenol. Examples of non-brominated aromatic dihydroxy compounds for copolymerization with the brominated aromatic dihydroxy compounds include bisphenol A, bis(4-hydroxyphenyl)methane, 2,2-bis(4-hydroxy-3-methylphenyl)propane, 4,4-bis(4-hydroxyphenyl)heptane, and (3,3'-dichloro-4,4'-dihydroxydiphenyl)methane. Combinations of two or more different brominated and non-brominated aromatic dihydroxy compounds can be used. If a combination of aromatic dihydroxy compounds is used, then the combinations can contain 25 to 55 mole percent of the brominated aromatic dihydroxy compounds and 75 to 65 mole percent of a non-brominated dihydric phenol. Branched brominated polycarbonate oligomers can also be used, as can compositions of a linear brominated polycarbonate oligomer and a branched brominated polycarbonate oligomer. Combinations of different brominated copolycarbonate oligomers can be used. Various endcaps can be present, for example polycarbonates having phenol endcaps or 2,4,6-tribromophenol endcaps can be used.

Other types of brominated oligomers can be used, for example brominated epoxy oligomers. Examples of brominated epoxy oligomers include those derived from Bisphenol A, hydrogenated Bisphenol A, Bisphenol-F, Bisphenol-S, novolak epoxies, phenol novolac epoxies, cresol novolac epoxies, N-glycidyl epoxies, glyoxal epoxies dicyclopentadiene phenolic epoxies, silicone-modified epoxies, and epsilon-caprolactone modified epoxies. Combinations of different brominated epoxy oligomers can be used. Specifically, a tetrabromobisphenol A epoxy be used, having 2,4,6-tribromophenol endcaps. An epoxy equivalent weight of 200 to 3000 can be used.

In some embodiments a combination of two or more different brominated polymers are used to obtain the desired properties. The brominated polymers can differ in one or more of a property (e.g., polydispersity or molecular weight) or a structural feature (e.g., the identity of the repeating units, the presence of copolymer units, or the amount of bromine in the polymer). For example, two different TBBPA copolymers can be used, or a combination of a TBBPA copolymer and a brominated epoxy oligomer. Of course, two or more different poly(siloxane) copolymers can be used with two or more different brominated polymers.

The poly(siloxane) copolymer compositions, for example the poly(siloxane-etherimide) copolymer compositions, can further optionally comprise one or more polymers additional to the poly(siloxane) copolymer and the brominated polymer, which can be referred to herein as "one or more third polymers" for convenience. The one or more third polymers can be homopolymers or copolymers and can have repeating units that are the same or different from first repeating units of the poly(siloxane) copolymer. The one or more third polymers can comprise different types of repeating units, provided that the type and amount of repeating units does not significantly adversely affect the desired properties of the compositions, in particular low smoke density and low heat release. The one or more third polymers can comprise carbonate units (1), imide units, etherimide units (17), arylene ether sulfone units (26), arylene ether units (28), ester units (29), or a combination of units comprising at least one of the foregoing. However, in an embodiment, the one or more third polymers do not contain either polysiloxane units or bromine.

The one or more third polymers can have an Mw, for example, of 5,000 to 500,000 Daltons, specifically 10,000 to 250,000 Daltons, or 10,000 to 100,000 Daltons, as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min. The one or more third polymers can have an MVR, measured at 300° C. under a load of 1.2 kg, of 0.1 to 200 cubic centimeters per 10 minutes ($cm^3/10$ min), specifically 1 to 100 $cm^3/10$ min.

The one or more third polymers is selected and used in an amount to provide the desired characteristics to the compositions. The amount of the one or more third polycarbonates can be 0 to 85 wt %, 1 to 80 wt %, 5 to 75 wt %, 8 to 60 wt %, 20 to 50 wt %, or to 40 wt %, based on the total weight of the first polymer, the second polymer, and the one or more third polymers. In a specific embodiment the he third polymer is present in an amount of 8 to 50 wt %, the polysiloxane unit is present in an amount of 1.5 to 3.5 wt %, and the bromine is present in an amount of 7.8 to 13 wt %, each based on the sum of the wt % of the first, second, and third polymers.

In a specific embodiment, in the polycarbonate compositions comprising a poly(siloxane-carbonate) and the TBBPA copolymer, an optional third polycarbonate can be present that is not same as the first poly(siloxane-carbonate) or the TBBPA copolymer. Specifically in certain embodiments, the one or more third polymers do not contain either polysiloxane units or bromine. In the alternative polycarbonate compositions comprising the poly(siloxane-carbonate) and the brominated oligomer, an additional polycarbonate that is not the same as the first poly(siloxane) or the brominated oligomer is present. Specifically, the additional polycarbonate does not contain polysiloxane units or bromine.

In another specific embodiment, in the poly(siloxane) copolymer compositions comprising a poly(siloxane-etherimide) and the brominated polymer, the optional third polymer is present, and is a polycarbonate that is not same as poly(siloxane-etherimide) or the brominated polymer. Specifically in certain embodiments, the third polymer does not contain either polysiloxane units or bromine.

When the optional one or more third polymer is a polycarbonate, the polymer comprises units of formula (1) as described above, specifically wherein R1 is derived from the dihydroxy aromatic compound (2) (3), (8), or a combination thereof, and more the specifically dihydroxy aromatic compound (3) containing no additional halogen atoms. In an embodiment, at least 60%, at least 80%, or at least 90% of the $R^1$ units are bisphenol A units. In an embodiment, the optional one or more third polymer (including the additional polycarbonate) is a homopolymer with bisphenol A carbonate units.

It is also possible for the one or more third polycarbonates or additional polycarbonates to contain units other than polycarbonate units, for example ester units (29), provided that the ester units are selected so as to not significantly adversely affect the desired properties of the poly(siloxane) copolymer compositions as described above. In an embodiment, the ester units are arylate ester unit derived from the reaction of an aromatic dihydroxy compound of formula (8) (e.g., resorcinol) with a combination of isophthalic and terephthalic diacids (or derivatives thereof). In another specific embodiment, the ester unit is derived from the reaction of bisphenol A with a combination of isophthalic acid and terephthalic acid. A specific poly(ester-carbonate) comprises ester units derived from resorcinol and isophthalic and/or terephthalic diacids, and carbonate units (1) derived from resorcinol, bisphenol A, or a combination of resorcinol and bisphenol A in a molar ratio of resorcinol carbonate units to bisphenol A carbonate units of 1:99 to 99:1, specifically 20:80 to 80:20. The molar ratio of ester units to carbonate units in these copolymers can vary broadly, for example 1:99 to 99:1, specifically 10:90 to 90:10, more specifically 25:75 to 75:25, depending on the desired properties of the final composition.

In addition to the poly(siloxane) copolymer, brominated polymer, and one or more optional third polymers, the poly (siloxane) copolymer compositions, for example the poly (siloxane-etherimide) copolymer compositions, can include various additives ordinarily incorporated into flame retardant compositions having low smoke density and low heat release, with the proviso that the additive(s) are selected so as to not adversely affect the desired properties of the poly(siloxane) copolymer composition significantly, in particular low smoke density low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per parts per hundred parts by weight of the combination of the first, second, and optional one or more third polymers (PHR).

In an advantageous embodiment, it has been found that certain important additives can be used without adversely affecting the heat release and low smoke properties of the poly(siloxane) copolymer compositions, for example the poly(siloxane-etherimide) copolymer compositions, significantly, in particular UV stabilizers, heat stabilizers (including phosphites), other flame retardants (such as Rimar salts) and certain pigments. The use of pigments such as titanium dioxide produces white compositions, which are commercially desirable. Pigments such as titanium dioxide (or other mineral fillers) can be present in the poly(siloxane) copolymer compositions, for example the poly(siloxane-etherimide) copolymer compositions, in amounts of 0 to 12 wt %, 0.1 to 9 PHR, 0.5 to 5 PHR, or 0.5 to 3 PHR.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene (3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Exemplary heat stabilizer additives include organophosphites such as triphenyl phosphite, tris-(2,6-dimethylphenyl) phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1- benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Additional monomeric flame retardants include organic compounds that include phosphorus, bromine, and/or chlorine. Non-brominated and non-chlorinated phosphorus-containing flame retardants can be added for certain applications, for example organic compounds containing phosphorus-nitrogen bonds.

Inorganic flame retardants can also be used, for example salts of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 PHR.

Anti-drip agents in most embodiments are not used in the poly(siloxane) copolymer compositions, for example the poly(siloxane-etherimide) copolymer compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the poly(siloxane) copolymer compositions, for example the poly(siloxane-etherimide) copolymer compositions, in some embodiments.

Methods for forming the poly(siloxane) copolymer compositions, for example the poly(siloxane-etherimide) copolymer compositions, can vary. In an embodiment, the poly (siloxane) copolymer such as the poly(siloxane-etherimide) copolymer, brominated polymer, and optional one or more third polymers are combined (e.g., blended) with any additives (e.g., a mold release agent) such as in a screw-type extruder. The poly(siloxane) copolymer, brominated polymer, optional one or more third polymers and any additives can be combined in any order, and in form, for example, powder, granular, filamentous, as a masterbatch, and the like. The composition can then be foamed, extruded into a sheet or optionally pelletized. Methods of foaming a thermoplastic composition using frothing or physical or chemical blowing agents are known and can be used. The pellets can be used for foaming, molding into articles, or they can be used in forming a sheet of the flame retardant poly(siloxane) copolymer composition. In some embodiments, the composition can be extruded (or co-extruded with a coating or other layer) in the form of a sheet and/or can be processed through calendaring rolls to form the desired sheet.

As discussed above, the poly(siloxane) copolymer compositions, for example the poly(siloxane-etherimide) copolymer compositions, are formulated to meet strict flammability requirements. The poly(siloxane) copolymer compositions, for example the poly(siloxane-etherimide) copolymer compositions, have an E662 smoke test $D_{max}$ value of less than 200 when tested at a thickness of 1.6 mm, and in some embodiments can further have a value of less than 150, less than 100, less than 80. The poly(siloxane) copolymer compositions, for example the poly(siloxane-etherimide) copolymer compositions, can have an E662 smoke test $D_{max}$ value of 70 to 200, 70 to 150, 70 to 100, or 70 to 80.

The poly(siloxane) copolymer compositions, for example the poly(siloxane-etherimide) copolymer compositions, further have an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d). In some embodiments the poly(siloxane) copolymer compositions, for example the poly(siloxane-etherimide) copolymer compositions, can have an OSU integrated 2 minute heat release test value of less than 55 kW-min/m$^2$ and a peak heat release rate of less than 55 kW/m$^2$ as measured using the method of FAR F25.4, in accordance with Federal Aviation Regulation FAR 25.853 (d).

The poly(siloxane) copolymer compositions, for example the poly(siloxane-etherimide) copolymer compositions, can further be formulated to have a haze less of than 15% and a transmission of greater than 75%, each measured using the color space CIE1931 (Illuminant C and a 2° observer) or according to ASTM D 1003 (2007) using illuminant C at a 0.125 inch (3.2 mm) thickness. In some embodiments, the compositions can be formulated such that an article molded from the composition has all three of a haze less of than 15% and a transmission of greater than 75%, each measured using the color space CIE1931 (Illuminant C and a 2° observer) or according to ASTM D 1003 (2007) using illuminant C at a 0.125 inch (3.2 mm) thickness, and a room temperature notched Izod impact of greater than 500 J/m as measured according to ASTM D 256-10 at a 0.125 inch (3.2 mm) thickness.

The poly(siloxane) copolymer compositions, for example the poly(siloxane-etherimide) copolymer compositions, can further be formulated to have a hydrogen to carbon ratio of 0.81:1 to 0.88:1.

Density (or specific gravity) is a critical factor in aircraft components, and the poly(siloxane) copolymer compositions, for example the poly(siloxane-etherimide) copolymer compositions, can be formulated to have lower densities, in particular a density of 1.31 grams per cubic centimeter (g/cc) or less, 1.30 g/cc or less, or 1.29 g/cc or less. Such densities can generally be obtained when the amount of bromine is less than 15 wt %, 13 wt %, 12 wt %, 11 wt %, 10 wt %, 9 wt %, 8 wt %, or 7.8 wt %, each based on the total weight of the first polymer, second polymer, and optional one or more third polymers.

The compositions can further have good melt viscosities, which aids processing. The poly(siloxane) copolymer compositions, for example the poly(siloxane-etherimide) copolymer compositions, can have a melt volume rate (MVR volume flow rate, cubic centimeter per 10 minutes (cc/10 min), according to ASTM D 1238) of less than 20, less than 19, less than 18, less than 17, less than 16, less than 15, or less than 12, measured at 300° C./1.2 Kg at 360 second dwell.

In a specific embodiment, the polycarbonate compositions (i.e., compositions containing poly(siloxane-carbonate), brominated polymer, and one or more optional third polycarbonates) are formulated to meet strict flammability requirements. The compositions have an E662 smoke test $D_{max}$ value of less than 200 when tested at a thickness of 1.6 mm, and in some embodiments can further have a value of less than 150, less than 100, less than 80, or 70 to 72.

The polycarbonate compositions can further have an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d). In some embodiments the polycarbonate compositions can have an OSU integrated 2 minute heat release test value of less than 55 kW-min/m$^2$ and a peak heat release rate of less than 55 kW/m$^2$ as measured using the method of FAR F25.4, in accordance with Federal Aviation Regulation FAR 25.853 (d).

The polycarbonate compositions can further have excellent impact strength, particularly when the average value of E is higher, i.e., 25-200, 25-100, or 25 to 50. Such compositions often have higher siloxane levels, i.e., at least 2.0 wt %, specifically 2.0 to 8 wt %, 2.0 to 5 wt %, 2.0 to 4 wt %, or 2.0 to 3.5 wt %, each based on the total weight of the poly(siloxane-carbonate), brominated copolymer, and optional one or more third polymers, or based on the total weight of the first polymer, the brominated oligomer, and the optional additional polycarbonate. An article molded from the polycarbonate compositions can have a notched Izod impact of greater than 500 J/m as measured according to ASTM D 256-10 at a 0.125 inch (3.2 mm) thickness. In some embodiments the articles have 80% or 100% ductility.

In some applications, it can be desirable to have a transparent article. Haze values, as measured using the color space CIE1931 (Illuminant C and a 2° observer), or by ANSI/ASTM D1003 (2007), Procedure A, illuminant C, can be a useful determination of the optical properties of the transparent flame retardant polycarbonate sheet. The lower the haze levels, the better the transparency of the finished sheet. In an embodiment, haze levels for an article comprising the polycarbonate composition, when measured at a thickness of 1.5 millimeters (mm), can be less than 10%, specifically 0 to 10%, 0.5 to 10%, and more specifically 1 to 10%, and transparency can be 70% or greater, specifically 80% or greater, greater than or equal to 75%, more specifically, greater than or equal to 90%, as measured using the color space CIE1931 (Illuminant C and a 2° observer), or in accordance with ASTM D1003-07, Procedure A, illuminant C. These values can be obtained even when average value of E in the poly(siloxane-carbonate) is higher, i.e., 25 to 200, 25 to 100, or 25 to 50. Such compositions often have higher siloxane levels, i.e., at least 2.0 wt %, specifically 2.0 to 8 wt %, 2.0 to 5 wt %, 2.0 to 4 wt %, or 2.0 to 3.5 wt %, based on the total weight of the polymers (and oligomers, if present) in the polycarbonate compositions. The TBBPA copolymer can be present in an amount from 35 to 50 wt %, and the bromine can be present in an amount of at least 7.8 wt %, specifically 8 to 25 wt %, more specifically 8 to 13 wt %, or 10 to 13 wt %, each based on the total weight of the poly(siloxane-carbonate), TBBPA copolymer, and optional one or more third polymers. The bromine-containing oligomer can be present in an amount from 15 to 30 wt %, and the bromine can be present in an amount greater than 8 wt %, specifically 8 to 25 wt %, more specifically 8 to 13 wt %, based on the total weight of the poly(siloxane-carbonate), the brominated oligomer, and the additional polycarbonate.

In another embodiment, even greater transparency can be obtained when the poly(siloxane-carbonate) has an average value of E that is lower, i.e., 5 to 75, 5 to 50, or 5 to 15, specifically 7 to 13, or 8 to 12. Such compositions further have at least 30 wt %, specifically 30 to 80 wt %, or 30 to 60 wt % of the poly(siloxane-carbonate), at least 20 wt %, specifically 20 to 70 wt %, or 20 to 65 wt % of the TBBPA copolymer, and 0 to 50 wt %, specifically 0 to 30 wt %, or 5 to 20 wt % of the optional third copolymer; lower siloxane levels, i.e., at least 0.3 wt %, specifically 0.3 to 2 wt %, 0.3 to 1 wt %, 0.3 to 0.8 wt %; and at least 5 wt %, specifically 5 to 20 wt % bromine, 5 to 10 wt %, or 7.8 to 13 wt % of bromine, each based on the total weight of the first polymer, TBBPA copolymer, and optional one or more third polymers.

Density (or specific gravity), is a critical factor in aircraft components, and the polycarbonate compositions can be formulated to have lower densities, in particular a density of 1.31 g/cc or less, 1.30 g/cc or less, or 1.29 g/cc or less. Such densities can generally be obtained when the amount of bromine is less than 15 wt %, 13 wt %, 12 wt %, 11 wt %, 10 wt %, 9 wt %, 8 wt %, or 7.8 wt %, each based on the total weight of the poly(siloxane-carbonate), TBBPA copolymer, and optional one or more third polymers, or based on the total weight of the poly(siloxane-carbonate), the brominated oligomer, and the additional polycarbonate.

The compositions can further have good melt viscosities, which aids processing. The polycarbonate compositions can have a melt volume rate (MVR, cc/10 min, according to ASTM D 1238) of less than 20, less than 19, less than 18, less than 17, less than 16, less than 15, or less than 12, measured at 300° C./1.2 Kg at 360 second dwell.

As mentioned throughout, the poly(siloxane) copolymer compositions, for example the poly(siloxane-etherimide) copolymer compositions, can be used in a wide variety of applications, particularly those requiring low smoke and low heat release values. Articles comprising the poly(siloxane) copolymer compositions, for example the poly(siloxane-etherimide) copolymer compositions, can be manufactured by foaming, molding, thermoforming, extruding, or casting the poly(siloxane) copolymer compositions, for example the poly(siloxane-etherimide) copolymer compositions. Thus the poly(siloxane) copolymer compositions, for example the poly(siloxane-etherimide) copolymer compositions, can be used to form a molded article, a foamed article, a thermoformed article, an extruded film, an extruded sheet, one or more layers of a multi-layer article, a substrate for a coated article or a substrate for a metallized article.

Illustrative articles include access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like. The poly(siloxane) copolymer compositions, for example the poly(siloxane-etherimide) copolymer compositions, are particularly useful in train and aircraft, for example a variety of aircraft compartment interior applications, as well as interior applications for other modes of transportation, such as bus, train, subway, marine, and the like. The articles manufactured from the compositions described herein can thus be a component of an aircraft, train, marine, subway vehicle, or other transportation applications. In a specific embodiment the articles interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The poly(siloxane) copolymer compositions, for example the poly(siloxane-etherimide) copolymer compositions, can be formed (e.g., molded) into sheets that can be used for any of the above mentioned components. It is generally noted that the overall size, shape, thickness, optical properties, and the like of the polycarbonate sheet can vary depending upon the desired application.

In some applications, it can be desirable to have a transparent flame retardant article, such as a sheet. With regard to the transparency of the sheet, end user specifications (e.g., commercial airline specifications) generally specify that the component satisfy a particular predetermined threshold. Haze values, as measured using the color space CIE1931 (Illuminant C and a 2° observer), or by ANSI/ASTM D1003-00, Procedure A, illuminant C, can be a useful determination of the optical properties of the transparent flame retardant polycarbonate articles such as a sheet. The lower the haze levels, the better the transparency of the finished article.

The transparent poly(siloxane) copolymer compositions, for example the poly(siloxane-etherimide) copolymer compositions, have special utility in applications requiring clarity, for example any of the above articles or components can be manufactured using the transparent polycarbonate compositions disclosed herein. In an embodiment, the transparent polycarbonate compositions are used for the manufacture of balcony components, balusters for stairs and balconies, ceiling panels, covers for life vests, covers for storage bins, dust covers for windows, layers of an electrochromic device, lenses for televisions, electronic displays, gauges, or instrument panels, light covers, light diffusers, light tubes and light pipes, mirrors, partitions, railings, refrigerator doors, shower doors, sink bowls, trolley cart containers, trolley cart side panels, windows, or the like, particularly in aircraft, marine transports, or trains.

Any of the foregoing articles, but in particular the transparent articles, can further have a hardcoat disposed on a surface of the article to enhance abrasion and scratch resistance, chemical resistance, and the like. Hardcoats are known in the art, and include, for example, various polyacrylates such as hyperbranched polyacrylates, silicones, polyfluoroacrylates, urethane-acrylates, phenolics, perfluorpolyethers, and the like.

The disclosure is further illustrated by the following Examples. It should be understood that the non-limiting examples are merely given for the purpose of illustration. Unless otherwise indicated, parts and percentages are by weight based upon the total weight of the poly(siloxane) copolymer, brominated polymer, and optional one or more third polymers in the poly(siloxane) copolymer compositions, for example the poly(siloxane-etherimide) copolymer compositions. The amount of additives is thus given in parts by weight per hundred parts by weight of the resins (PHR)

EXAMPLES

Materials.

The descriptions of the polycarbonates and polycarbonate copolymers used in the Examples are described in Table 1. Methods for preparing the brominated polycarbonates and the poly(siloxane-carbonate) copolymers are described after Table 1.

In Table 1, a reference to D10, D30, or D45 means a dimethylsiloxane block having an average length of 10.5+/−2.5, with two additional terminal silicon group (with silicon hydride levels of less than 20 ppm, volatiles of less than 0.4%), 30+/−4 with two additional terminal silicon groups (with silicon hydride levels of less than 20 ppm, volatiles of less than 0.4%, and D3 and D4 levels of less than 10 and 1000 ppm respectively), or 45+/−5 with two additional terminal silicon groups (with silicon hydride levels of less than 20 ppm, volatiles of less than 0.4%, and D3 and D4 levels of less than 10 and 1000 ppm respectively). The values of D and wt % siloxane for the copolymers in Table 1 were as charged to the reactor.

The weight average molecular weights (Mw) of the polymers and copolymers in Table 1 were measured by gel permeation chromatography using polycarbonate standards. The endcap was PCP (p-cumyl phenol) or phenol. The percent of siloxane and bromine is weight percent based on the weight of the copolymer.

TABLE 1

| Acronym | Description | Mw | PDI | Endcap | Wt % Siloxane | Avg. Siloxane Length | Wt % Br |
|---|---|---|---|---|---|---|---|
| TBBPA-BPA | TetrabromoBPA/BPA Copolymer | 23,660 | 2.6 | PCP | — | — | 26 |
| BC52 | Tetrabromo BPA Oligomer | 2,638 | 1.7 | Phenol | — | — | 52 |
| SiPC 1 | D10 siloxane block co-polycarbonate | 30,000 | — | PCP | 1 | 10 | — |
| SiPC 1B | D10 siloxane block co-polycarbonate | 22,200 | — | PCP | 1 | 10 | — |
| SiPC 2 | D10 siloxane block co-polycarbonate | 23,600 | 3.0 | PCP | 5 | 10 | — |
| SiPC 3 | D30 siloxane block co-polycarbonate | 23,472 | 2.2 | PCP | 6 | 30 | — |
| SiPC 4 | D45 siloxane block co-polycarbonate | 23,013 | 2.2 | PCP | 6 | 45 | — |
| SiPC 5 | D45 siloxane block co-polycarbonate | 29,852 | 2.6 | PCP | 20 | 45 | — |
| PC 1 | PCP Capped BPA Polycarbonate | 21,900 | 2.5 | PCP | — | — | — |
| PC 2 | PCP Capped BPA Polycarbonate | 29,830 | 2.5 | PCP | — | — | — |

TBBPA-BPA Copolymer.

A representative reaction description for a 26 wt % bromine copolycarbonate batch is as follows.

To the formulation tank was added dichloromethane (16 L), DI water (12 L), bisphenol A (2250 g, 9.9 moles), tetrabromobisphenol A (2250 g, 4.1 moles), p-cumylphenol (102 g, 0.48 mole), triethylamine (75 g, 0.74 mole) and sodium gluconate (10 g). The mixture was transferred to the batch reactor. The reactor agitator was started and circulation flow was set at 80 L/min. Phosgene flow to the reactor was initiated (80 g/min rate). A pH target of 10.0 was maintained throughout the batch by the addition of 33% aqueous sodium hydroxide. The total phosgene addition amount was 2500 g (25.3 moles). After the phosgene addition was complete, a sample from the reactor was obtained and verified to be substantially free of unreacted monomers and chloroformates. Mw of the reaction sample was determined by GPC (Mw=23660, PDI=2.6). The reactor was purged with nitrogen then the batch was transferred to the centrifuge feed tank. To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (210° F.). Mw=23532. A pressed film of a sample of the polymer was transparent and tough.

SiPC 1 (1D10 Copolymer): A representative reaction description for a 1% siloxane D10 poly(siloxane-carbonate) is as follows. To the formulation tank was added dichloromethane (15 L), DI water (12 L), bisphenol A (4410 g, 19.3 moles), D10 eugenol-capped siloxane (90 g, 0.07 moles), p-cumylphenol (174 g, 0.82 mole), triethylamine (30 g, 0.30 mole) and sodium gluconate (10 g). The mixture was transferred to the batch reactor. The reactor agitator was started and circulation flow was set at 80 L/min Phosgene flow to the reactor was initiated (80 g/min rate). A pH target of 10.0 was maintained throughout the batch by the addition of 33% aqueous sodium hydroxide. The total phosgene addition amount was 2300 g (23.3 moles). After the phosgene addition was complete, a sample from the reactor was obtained and verified to be substantially free of unreacted BPA and chloroformates. Mw of the reaction sample was determined by GPC (Mw=22370 Daltons, PDI=2.4). The reactor was purged with nitrogen then the batch was transferred to the centrifuge feed tank.

To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (99° C. (210° F.)).

SiPC 2 (5D10 Copolymer).

A representative reaction description for a 5 wt % siloxane D10 poly(siloxane-carbonate) batch is as follows.

To the formulation tank was added dichloromethane (15 L), DI water (12 L), bisphenol A (4125 g, 18.1 moles), D10 eugenol capped siloxane (375 g, 0.30 moles), p-cumylphenol (166 g, 0.78 mole), triethylamine (30 g, 0.30 mole) and sodium gluconate (10 g). The mixture was transferred to the batch reactor. The reactor agitator was started and circulation flow was set at 80 L/min. Phosgene flow to the reactor was initiated (80 g/min rate). A pH target of 10.0 was maintained throughout the batch by the addition of 33% aqueous sodium hydroxide. The total phosgene addition amount was 2300 g (23.3 moles). After the phosgene addition was complete, a sample of the reactor was obtained and verified to be substantially free of unreacted BPA and chloroformates. Mw of the reaction sample was determined by GPC (Mw=21991 Daltons, PDI=2.6). The reactor was purged with nitrogen then the batch was transferred to the centrifuge feed tank.

To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (210° F.). Mw=21589 Daltons.

SiPC 3 (6D30 Copolymer).

The 6D30 copolymer (6 wt % siloxane D30 poly(siloxane-carbonate)) was made in similar fashion to Examples 14 and 15 in U.S. Pat. No. 6,870,013 using a D30 eugenol-capped siloxane fluid. The polymer contains about 6 wt % siloxane. The Mw is about 23,500 Daltons.

SiPC 4 (6D45 Copolymer).

The 6D45 polymer (6 wt % siloxane D45 poly(siloxane-carbonate)) was made in similar fashion to Examples 14 and 15 in U.S. Pat. No. 6,870,013 using D45 eugenol-capped siloxane fluid. The polymer contains about 6% siloxane. The Mw is about 23,000 Daltons.

SiPC 5 (20D45 Copolymer):

The 20D45 polymer (20 wt % siloxane D45 poly(siloxane-carbonate)) was made in a like manner to the 5D10 poly(siloxane-carbonate) except that a D45 eugenol-capped siloxane fluid was used. The polymer contains about 20% siloxane. The Mw is about 30,000 Daltons.

The additive types and details that were used in the compositions of the Examples are shown in Table 2.

TABLE 2

| Component | Chemical Name | Supplier | Grade |
|---|---|---|---|
| Phosphite | Tris (2,4-di-tert-butylphenyl) phosphite | various | |
| DF1040 | Methylhydrogen siloxane fluid | Momentive Performance Materials | DF 1040 |
| OPTS | Octaphenylcyclotetrasiloxane | Shin-Etsu Chemical Co. | — |
| D4 | Octamethyltetrasiloxane | Aldrich Chemical Co. | — |
| KSS | Potassium diphenylsulfone sulfonato | Arichem LLC | KSS |
| Rimar salt | Potassium perfluorobutane sulfonato | Lanxess | Bayowet C4 |
| STB | Sodium trichlorobenzene sulfonato sesquihydrate | Arichem LLC | STB |

TABLE 2-continued

| Component | Chemical Name | Supplier | Grade |
|---|---|---|---|
| TSAN | SAN encapsulated PTFE | Sabic Innovative Plastics | TSAN |
| TiO$_2$ Type 1 | Titanium dioxide, (organic coating) | Kronos | Kronos 2233 |
| TiO$_2$ Type 2 | Titanium dioxide, (organic coating) | Kronos | KRONOS 2450 |
| Phosphorus acid | Phosphorus acid solution (0.15%) | | |
| Tinuvin 1577 | 2-(4,6-Diphenyl-1,3,5-triazin-2-yl)-5-hexyloxyphenol | Ciba Specialty Company Corp. | Tinuvin 1577 FF |
| UVA 234 | 2-(2-hydroxy-3,5-di-cumyl)benzotriazole | Ciba Specialty Company Corp. | Tinuvin 234 |
| Cyasorb 3638 | 2,2'-(1,4-Phenylene)bis[4H-3,1-benzoxazin-4-one] | CYTEC Industries | CYASORB UV-3638 |

Extrusion and Molding Conditions.

Extrusions were performed either on a single screw extruder or a twin-screw extruder. Typically the D10 poly(siloxane-carbonate)-containing compositions and corresponding controls were performed on a single or a twin screw extruder. The D30 and D40 poly(siloxane-carbonate)-containing compositions and corresponding controls were performed on a twin screw extruder.

The compositions prepared with a single screw extruder were made as follows. All ingredients were dry blended for about 4 minutes using a paint shaker. The single screw extruder was a Sterling 1¾ inch (44.5 mm) extruder (Length/Diameter (L/D) ratio=24/1, with a vacuum port located near die face, with barrel and die temperature set points of 270, 275, 288, 288° C.).

The compositions prepared on the 30 mm WP twin screw extruder were made as follows. All ingredients were dry blended for about 4 minutes using a paint shaker or a drum tumbler. The twin screw extruder contained a vacuum port located near die face. Typically the compositions were compounded with an applied vacuum of 20+ inches of Hg.

The compositions prepared on a W&P 50 mm Mega twin screw were made as follows. All additives (stabilizers and/or colorants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The compositions were compounded with an applied vacuum of 20+ inches of Hg. The extruder was a nine-barrel machine (approx Length/Diameter (L/D) ratio=36:1) with a vacuum port located in barrel 7.

The compositions were molded after drying at 121° C. for 4 hrs on a 260-ton (236 metric ton) Van Dorn or an 85 Ton Van Dorn molding machine operating at about 300 to 320° C. with a mold temperature of about 80° C. It will be recognized by one skilled in the art that the method is not limited to these temperatures or processing equipment.

Testing Methods.

Standard ASTM testing was performed at 50% relative humidity (RH) and unless otherwise indicated at room temperature (RT).

Notched Izod (NI-125) testing was conducted according to ASTM D 256-10 on a molded sample having a 0.125 inch (3.2 mm) thickness.

Multiaxial impact (MAI) was measured at a speed of 3.3 m/s on a 3.2×102 mm disc using a plunger with a hemispherical end and a diameter 12.70 mm in accordance with ASTM D3763.

Heat deflection temperature was measured on an annealed 3.2 mm sample in accordance with ASTM D 648 using a stress of 0.455 or 1.82 Mpa.

The tensile properties were measured in accordance with ASTM D638 at 50 mm/min.

The flexural properties were measured in accordance with ASTM D 790 at 1.27 mm/min.

In most cases melt volume ratio (MVR) was run at 300° C./1.2 Kg at 360 second dwell.

Molecular weight was measured via GPC using polycarbonate standards.

The reported transmission data (% T) was measured at the indicated thickness on a Gretagmacbeth Color-Eye 7000A (Propalette Optiview Gold version 5.2.1.7) using the color space CIE1931 (Illuminant C and a 2° observer) and is equivalent to the "Y" tristimulus value.

The reported the yellowness Index (YI) data was measured at the indicated thickness on a Gretagmacbeth Color-Eye 7000A (Propalette Optiview Gold version 5.2.1.7) in accordance with ASTM E313-73 (D1925) using Illuminant C and a 2° observer.

Heat release testing was performed on 15.2×15.2 cm plaques 1.5 mm thick using the Ohio State University (OSU) rate-of-heat release apparatus, in accordance with the method shown in FAR 25.853 (d), and in Appendix F, section IV (FAR F25.4). Total heat release was measured at the two-minute mark in kW-min/m2 (kilowatt minutes per square meter). Peak heat release was measured as kW/m2 (kilowatts per square meter). The heat release test method is also described in the "Aircraft Materials Fire Test Handbook" DOT/FAA/AR-00/12, Chapter 5 "Heat Release Test for Cabin Materials."

Smoke density testing (ASTM E-662-83, ASTM F-814-83, Airbus ABD0031, Boeing BSS 7239) was performed on 7.5×7.5 cm plaques of 1.5 mm thickness according to the method shown in FAR 25.853 (d), and in Appendix F, section V (FAR F25.5). Smoke density was measured under flaming mode. Smoke density ($D_s$) at 4.0 min, and the max level (DsMax) were reported.

Low Heat Release and Low Smoke Density Compositions.

1. 1D10 (SiPC 1) Blends with TBBPA-BPA Copolymer.

Table 3 illustrates that a combination of a poly(siloxane-carbonate) having an average siloxane block length (D) of about 10 units and 1 wt % siloxane in the copolymer and a bromine-containing copolycarbonate can produce a blend composition with excellent flame and smoke performance (EX 1-4) compared with compositions having only the brominated copolycarbonate (CEX 2-6), only the poly(siloxane-carbonate) (CEX 1) or only a polycarbonate without either the poly(siloxane-carbonate) or the brominated polycarbonate present (CEX 2).

Specifically a composition having poly(siloxane-carbonate) in combination with a polycarbonate (CEX 1) passes the smoke testing (DsMax) target of less than 200 with a value of 109 but fails the 2-minute OSU test target of less than 65 kW-min/m² with a value of 68 and also fails the peak OSU test target of less than 65 with a value of 98. As brominated copolycarbonate is added to the composition the 2-minute OSU performance and the peak OSU performance improves (EX 1-EX 4) and both the target values for the 2-minute and peak OSU target values are achieved (values below 65) while the smoke performance (DsMax) is maintained at passing levels (values less than 200). This improvement in flame test performance was achieved with as little as 5.2 wt % bromine in the composition (EX 1). In addition EX 1-EX 4 all have densities below the targeted maximum density of 1.320 for aircraft applications. A polycarbonate composition without the poly(siloxane-carbonate) or the brominated copolycarbonate(CEX 2) also fails both the 2-minute and peak OSU performance tests with values of 73 and 139 although it too passes the smoke test (DsMax) with a value of 139.

The benefit of the presence of siloxane in the composition is illustrated by compositions that only contain the brominated copolycarbonate only (CEX 3-6). They pass the OSU flame testing with 2-minute values of less than 65 and the OSU peak testing with values of less than 65 but perform very poorly in the smoke test exceeding the target of less than 200 with values of 561, 382 and 467.

Furthermore the clarity as measured by % transmission and % haze is excellent for the poly(siloxane-carbonate) compositions with the brominated copolycarbonate (EX 1-4) with transmission values of 88% or greater and haze values of 1.2% or less. These values are as good or better than the polycarbonate control (CEX 2) with a transmission of 89 and a % haze of 2.4. The yellowness index value, a measure of how yellow the part appears, for EX 1 and EX 2 at 2.7 and 2.9 is also very close to the value for the polycarbonate control 2.4. As the brominated copolycarbonate content increases the yellowness index increases significantly from 2.5 (EX 1) at 5.2% bromine content to 5.2 at 13% bromine content (EX 4). High clarity, low yellowness, and low density values in combination with excellent flame and smoke performance are critical for use of these compositions in airplane window applications and so higher bromine content compositions are expected to have limited utility in window applications.

Notched Izod impact values at or near 2 ft-lbs/in (1.00 J/cm) or greater can also provide sufficient ductility for preparation of polycarbonate sheet for use in window applications and EX 1-3 possess the targeted ductility performance for window applications as well. As the bromine contents of the compositions increase the notched Izod ductility decreases to values less than 2 (EX 4 and CEX 5-6) and so high bromine contents in the compositions at 11% or greater would likely not be useful in window applications.

TABLE 3

| Components and Properties | | CEX 1 | EX 1 | EX 2 | EX 3 | EX 4 | CEX 2 | CEX 3 | CEX 4 | CEX 5 | CEX 6 |
|---|---|---|---|---|---|---|---|---|---|---|---|
| TBBPA-BPA | | 0 | 20 | 30 | 40 | 50 | 0 | 20 | 30 | 40 | 80 |
| SiPC 1 | | 40 | 40 | 40 | 40 | 40 | | | | | |
| PC 2 | | 60 | 40 | 30 | 20 | 10 | 100 | 80 | 70 | 60 | 50 |
| IRGAPHOS 168 | | 0.0 | 0.0 | 0.0 | 0.0 | 0.0 | 0.0 | 0.0 | 0.0 | 0.0 | 0.0 |
| Formulated Composition | Total wt % Siloxane | 0.4 | 0.4 | 0.4 | 0.4 | 0.4 | 0 | 0 | 0 | 0 | 0 |
| | Total wt % Bromine | 0 | 5.2 | 7.8 | 10.4 | 13 | 0 | 5.2 | 7.8 | 10.4 | 13 |
| | ~Siloxane D Length | 10 | 10 | 10 | 10 | 10 | — | — | — | — | — |
| MVR | | 6.5 | 6.0 | 5.6 | 5.6 | 5.3 | 6.4 | 6.6 | 6.8 | 6.8 | 6.4 |
| NI-125, RT | Ductility | 100 | 100 | 0 | 0 | 0 | 100 | 100 | 0 | 0 | 0 |
| | J/m | 949 | 867 | 128 | 109 | 92 | 887 | 850 | 130 | 91 | 87 |
| | Ft-lbs/in | 17.8 | 16.2 | 2.4 | 2.0 | 1.7 | 16.6 | 15.9 | 2.4 | 1.7 | 1.6 |
| MAI-RT | Ductility | 100.0 | 100.0 | 100.0 | 100.0 | 100.0 | 100.0 | 100.0 | 100.0 | 100.0 | 100.0 |
| Energy to max load-Avg | J | 79 | 78 | 76 | 75 | 81 | 75 | 75 | 76 | 78 | 78 |
| Energy to failure-Avg | J | 91 | 90 | 89 | 88 | 89 | 81 | 81 | 82 | 84 | 83 |
| Energy, Total-Avg | J | 91 | 90 | 89 | 88 | 89 | 81 | 81 | 84 | 84 | 83 |
| Density, -Avg | | — | 1.194 | 1.239 | 1.268 | 1.288 | 1.314 | 1.198 | 1.242 | 1.265 | 1.289 | 1.315 |
| Specific Gravity-Avg | | | 1.197 | 1.242 | 1.271 | 1.291 | 1.317 | 1.198 | 1.243 | 1.266 | 1.290 | 1.316 |
| HDT | 1.8 MPa | 128 | 132 | 137 | 137 | 142 | 132 | 137 | 139 | 142 | 143 |
| OSU Test FAR 25.853 (d) Appendix F, Part IV | | | | | | | | | | | |
| 2 Min OSU | Average | 68 | 35 | 30 | 25 | 11 | 73 | 24 | 26 | 30 | 17 |
| | Standard deviation | 14 | 7 | 1 | 4 | 10 | 19 | 4 | 5 | 3 | 2 |
| Peak OSU | Average | 98 | 63 | 54 | 48 | 43 | 139 | 70 | 57 | 66 | 56 |
| | Standard deviation | 8 | 4 | 3 | 2 | 1 | 14 | 11 | 5 | 8 | 14 |
| NBS Smoke Density (ASTM F814/E662, Flaming Mode) | | | | | | | | | | | |
| DsMax | Ave | 109 | 139 | 68 | 97 | 59 | 137 | 561 | 382 | 457 | 304 |
| | Standard deviation | 28 | 44 | 32 | 18 | 23 | 19 | 164 | 69 | 243 | 181 |
| Optical Properties | | | | | | | | | | | |
| Optical Properties | % T at 62 mil (1.58 mm) | 89 | 89 | 89 | 88 | 88 | 89 | 89 | 89 | 88 | 88 |
| | YI | 2.7 | 2.7 | 2.9 | 5.1 | 5.2 | 2.4 | 3.3 | 4.1 | 5.0 | 5.0 |
| | % Haze | 1.0 | 0.6 | 0.7 | 0.8 | 1.2 | 2.4 | 1.7 | 1.4 | 1.8 | 1.7 |

2. 5D10 Compositions (SiPC 2) with TBBPA-BPA Copolymer

The results in Table 4 using a poly(siloxane-carbonate) having an average siloxane block length of 10 units and 5 wt % siloxane in the copolycarbonate further illustrates that a combination of polysiloxane block copolycarbonates and a brominated copolycarbonate outperforms either polysiloxane block co polycarbonate compositions or the brominated polycarbonate compositions in OSU flame and smoke density testing.

TABLE 4

| Components and Properties | | CEX 7 | EX 5 | EX 6 | EX 7 | EX 8 | CEX 8 |
|---|---|---|---|---|---|---|---|
| TBBPA-BPA | | 0 | 50 | 70 | 80 | 90 | 100 |
| SiPC 2 | | 100 | 50 | 30 | 20 | 10 | 0 |
| IRGAPHOS 168 | | 0.06 | 0.06 | 0.06 | 0.06 | 0.06 | 0.06 |
| Formulated | Total wt % Siloxane | 5.0 | 2.5 | 1.5 | 1.0 | 0.5 | 0.0 |
| Composition | Total wt % Bromine | 0.0 | 13.0 | 18.2 | 20.8 | 23.4 | 26.0 |
| | ~Siloxane D Length | 10 | 10 | 10 | 10 | 10 | 10 |
| MVR-6 min | Cc/10 min. | 18.4 | 10.1 | 7.9 | 7.6 | 5.6 | 4.6 |
| Tg | ° C. | 141 | 161 | 168 | 170 | 178 | 182 |
| NI-125 RT | Ductility | 100 | 0 | 0 | 0 | 0 | 0 |
| | J/m | 721 | 127 | 78 | 68 | 57 | 50 |
| | ft-lbs/in | 13.5 | 2.4 | 1.5 | 1.3 | 1.1 | 0.9 |
| MAI-RT | Ductility | 100 | 100 | 100 | 100 | 100 | 60 |
| Energy to max load-Avg | J | 65 | 66 | 76 | 76 | 77 | 77 |
| Energy to failure-Avg | J | 73 | 72 | 82 | 82 | 82 | 83 |
| Energy, Total-Avg | | 73 | 72 | 82 | 83 | 82 | 83 |
| Modulus of Elasticity-Avg | MPa | 2220 | 2410 | 2500 | 2620 | 2660 | |
| Stress at Yield-Avg | MPa | 58 | 68 | 72 | 74 | 77 | |
| Stress at Break-Avg | MPa | 50 | 60 | 61 | 61 | 65 | |
| Elongation at Yield-Avg | % | 6 | 7 | 7 | 7 | 7 | |
| Elongation at Break-Avg | % | 87 | 105 | 95 | 92 | 102 | |
| Flexural Modulus-Avg | MPa | 2100 | 2280 | 2480 | 2420 | 2450 | |
| Flex Stress at 5% Strain-Avg | MPa | 84 | 93 | 99 | 98 | 101 | |
| Flexural Stress at Yield-Avg | MPa | 92 | 106 | 114 | 113 | 118 | |
| Density-Avg | | 1.183 | 1.307 | 1.363 | 1.385 | 1.422 | 1.450 |
| Specific Gravity-Avg | | 1.186 | 1.310 | 1.367 | 1.388 | 1.426 | 1.454 |
| HDT | 1.8 MPa | 117 | 134 | 136 | 146 | 150 | 156 |
| HDT | 0.455 MPa | 130 | 147 | 154 | 159 | 165 | 171 |
| OSU Test FAR 25.853 (d) Appendix F, Part IV | | | | | | | |
| OSU 2 Min. | Average | 102 | 40 | 27 | 34 | 28 | 26 |
| | Standard deviation | 11 | 3 | 6 | 3 | 6 | 5 |
| OSU Peak | Average | 93 | 45 | 37 | 36 | 37 | 47 |
| | Standard deviation | 13 | 2 | 3 | 3 | 3 | 12 |
| NBS Smoke Density (ASTM F814/E662 Flaming Mode) | | | | | | | |
| DsMax | Ave | 80.7 | 14.7 | 12.0 | 9.0 | 12.7 | 60.7 |
| | Standard deviation | 33.6 | 0.6 | 4.4 | 2.6 | 2.1 | 20.5 |
| Optical Properties | | | | | | | |
| % T at 62 mil (1.58 mm) | | 88.6 | 85.8 | 86.0 | 86.5 | 88.2 | 89.0 |
| YI | | 2.8 | 13.4 | 13.1 | 6.4 | 3.8 | 2.9 |
| % Haze | | 12.2 | 5.5 | 4.1 | 2.4 | 0.9 | 1.1 |

CEX 7 contains no bromine and fails both the OSU 2 min total and peak heat release tests with values greater than 65. CEX 7 in this test passed the $D_{max}$ flame test. CEX 8 has no siloxane present and it passes the OSU flame and peak heat release test with values below 65 but the Dmax values while passing with a value below 200, However, CEX 8 is extremely brittle which would make it difficult to machine and form into parts, and has a high density, which would by deleterious to weight savings needed to manufacture fuel efficient aircraft. By contrast compositions having poly(siloxane-carbonate) and brominated copolycarbonate passed OSU flame and peak heat test with values below 65 and exhibited Dmax smoke results of less than 15 with standard deviations below 4.4 units.

3. 6D30 (SiPC 2), 6D45 (SiPC 3) and 20D45 (SiPC 3) Compositions with TBBPA-BPA Copolymer The flame and smoke performances of a series of compositions using a bromine copolycarbonate having 26 wt % bromine atoms with siloxane block co-polycarbonates having average siloxane chain lengths of 45 and 30 and siloxane contents of 6 wt % in the copolymer and with a poly(siloxane-carbonate) having an average of 45 polysiloxane units and 20 wt % siloxane in the copolymer are shown in Table 5.

Examples EX 9-22 illustrate that the OSU flame and heat performance as well as smoke performance is maintained in compositions of polysiloxane block copolycarbonates and brominated polycarbonate copolymers with siloxane change lengths of 30 and 45 polysiloxane units and siloxane wt % as low as 5 wt % and as high as 20 wt % in the copolymers. Comparative example CEX 9 and CEX 5 (Table 3) that have no poly(siloxane-carbonate) in the compositions either fail the DsMax smoke test with a value of 195 and 457 or inconsistently pass as a result of high values and a high standard deviation of 78 and 243 units, respectively. This result illustrates once again that the presence of siloxane in the blend is necessary to achieve consistent smoke performance pass values.

EX 16 (without heat stabilizer), when compared with EX 17 (contain similar siloxane and bromine content as EX 16 but with heat stabilizer), demonstrates that the heat stabilizer IRGAPHOS 168 has no significant effect on the flame or smoke performance in the compositions.

High Impact Compositions.

Formulations passing both the OSU flame and smoke tests and having excellent room temperature ductility performance and high flow properties can also be achieved by some of the combinations of brominated polycarbonate copolymers and polysiloxane block copolycarbonates. For Example EX 9, 12 and 22 in Table 5 passed the 2-min flame and heat release tests with flame and heat release values less than 65 and smoke values below 200 and showed excellent room temperature ductility with 100% ductility and with impact energies of greater than 500 J/m at high melt flow values (MVR values of 9.6-12 cc/10 min.). The results from Table 5 shows that compositions with polysiloxane content greater than 1% achieve high room temperature impact (both EX 14 and EX 15 have identical bromine content but EX 14 has 1% polysiloxane content while EX 15 has 2 wt % polysiloxane content and EX 14 has no ductility and room temperature while EX 15 shows partial room temperature ductility). Furthermore it is also desirable for the compositions to have less than 13 wt % brominated copolycarbonate content in order to achieve high ductility (EX 9 and EX 10 both have 2 wt % polysiloxane in their compositions but EX 9 has 10.4 wt % bromine content from the brominated copolymer while EX 10 has 13 wt % bromine content and EX 9 has excellent room temperature impact while EX 10 has low room temperature impact). The examples show that the polysiloxane block copolycarbonates that have 20 wt % polysiloxane content are somewhat more efficient in providing high ductility and room temperature impact strength than the copolymers with 6 wt % content. EX 9 was made from a poly(siloxane-carbonate) having 20 wt % polysiloxane in the copolymer and EX 15 was made from a poly(siloxane-carbonate) having 6 wt % polysiloxane in the copolymer, and both have identical bromine and polysiloxane contents, but EX 9 has a higher impact and ductility value than EX 15. In addition the data in Table 5 show that high impact values could be achieved using both the polysiloxane block copolycarbonates having average siloxane chain lengths of 45 and 30 repeating units. Furthermore the high ductility can be achieved with copolymers having either 20% polysiloxane content or 6% polysiloxane content. In the case of the polysiloxane block copolycarbonates that have 6% polysiloxane content, it is also possible to achieve transparency. One particular benefit of the use of long siloxane chain lengths (chain lengths greater than 10 repeating units) and with about 6 wt % siloxane in the poly(siloxane-carbonate) copolymer is that a combination of high impact and transparency can be achieved in addition to maintaining excellent OSU flame and smoke performance in the compositions. Specifically EX 12 with 2 wt % siloxane and 7.8 wt % bromine content and that is formulated from a poly(siloxane-carbonate) having an average chain length of 45 siloxane and about 6 wt % siloxane in the copolymer has about 100% room temperature ductility during notched Izod testing, excellent haze with a value of 3.3% and an excellent % transmission with of value of

TABLE 5

| Components, Properties | | EX 9 | EX 10 | EX 11 | EX 12 | EX 13 | EX 14 | EX 15 | EX 16 |
|---|---|---|---|---|---|---|---|---|---|
| TBBPA-BPA | | 40 | 50 | 60 | 30 | 40 | 40 | 40 | 40 |
| 20D45 SiPC 5 | | 10 | 10 | 10 | | | | | |
| 6D45 SiPC 4 | | | | | 34 | 9 | 17 | 34 | 34 |
| 6D30 SiPC 3 | | | | | | | | | |
| PC1 | | 50 | 40 | 30 | 36 | 51 | 43 | 26 | 26 |
| PC 2 | | 0 | | | | | | | |
| IRGAPHOS 168 | | 0.06 | 0.06 | 0.06 | 0.06 | 0.06 | 0.06 | 0.06 | 0.00 |
| Total | Wt % Siloxane | 2.0 | 2.0 | 2.0 | 2.0 | 0.5 | 1.0 | 2.0 | 2.0 |
| Formulation | Wt % Bromine | 10.4 | 13.0 | 15.6 | 7.8 | 10.4 | 10.4 | 10.4 | 10.4 |
| | Siloxane D Length | 45 | 45 | 45 | 45 | 45 | 45 | 45 | 45 |
| MVR-6 min | Cc/10 min. | 11.1 | 9.7 | 7.5 | 13.6 | 15.8 | 13.7 | 11.4 | 11.4 |
| Tg | ° C. | 160 | 162 | 168 | 156 | 160 | 160 | 160 | 160 |
| NI-125 RT | Ductility | 100 | 0 | 0 | 100 | 0 | 0 | 60 | 40 |
| | J/m | 579.0 | 154.0 | 136.0 | 646 | 105 | 122 | 371 | 304 |
| | ft-lbs/in | 10.8 | 2.9 | 2.5 | 12.1 | 2.0 | 2.3 | 6.9 | 5.7 |
| MAI-RT | Ductility | 100 | 100 | 100 | 100 | 100 | 100 | 100 | 100 |
| Energy to max load-Avg | J | 71 | 74 | 76 | 75 | 73 | 77 | 75 | 75 |
| Energy to failure-Avg | J | 75 | 77 | 81 | 82 | 77 | 82 | 83 | 81 |
| Energy, Total-Avg | J | 75 | 77 | 81 | 82 | 77 | 82 | 83 | 81 |
| Density-Avg | | 1.281 | 1.306 | 1.330 | 1.254 | 1.284 | 1.281 | 1.277 | 1.276 |
| Specific Gravity-Avg | | 1.284 | 1.309 | 1.333 | 1.257 | 1.287 | 1.284 | 1.280 | 1.279 |
| HDT | 1.8 MPa | 139 | 141 | 144 | 128 | 134 | 133 | 132 | 132 |
| 2 Min OSU | Average | 32 | 23 | 19 | 46 | 39 | 41 | 45 | 35 |
| | Std. dev. | 3.2 | 1.9 | 4.7 | 5.7 | 3.6 | 6.0 | 4.5 | 2.7 |
| Peak OSU | Average | 50 | 42 | 41 | 55 | 49 | 48 | 55 | 46 |
| | Std. dev. | 3.8 | 2.3 | 3.1 | 3.0 | 3.4 | 3.3 | 2.2 | 4.1 |
| DsMax | Ave | 45 | 48 | 61 | 30 | 15 | 14 | 18 | 29 |
| | Std. dev. | 13 | 9 | 35 | 8 | 6 | 7 | 10 | 12 |
| % T at 62 mil (1.58 mm) | | | | | | | | | |
| YI | | | | | | | | | |
| % Haze | | | | | | | | | |
| YI at 125 mil (3.2 mm) | | 39 | 43 | 47 | 12 | 6 | 9 | 15 | 14 |
| % T at 125 mil (3.2 mm) | | 29.6 | 27.3 | 24.1 | 83.1 | 86.7 | 84.8 | 80.8 | 81.6 |
| % Haze at 125 mil (3.2 mm) | | 99.2 | 99.2 | 99.9 | 3.3 | 1.6 | 2.2 | 4.9 | 3.9 |

| Components, Properties | | EX 17 | EX 18 | EX 19 | EX 20 | EX 21 | EX 22 | CEX 9 |
|---|---|---|---|---|---|---|---|---|
| TBBPA-BPA | | 40 | 50 | 60 | 70 | 50 | 40 | 40 |
| 20D45 SiPC 5 | | | | | | | | |
| 6D45 SiPC 4 | | 34 | 34 | 34 | 25 | | | |
| 6D30 SiPC 3 | | | | | | 42 | 50 | |
| PC1 | | 26 | 16 | 6 | | | | |
| PC 2 | | | | | 5 | 8 | 10 | 60 |
| IRGAPHOS 168 | | 0.06 | 0.06 | 0.060 | 0.060 | 0.06 | 0.06 | 0.06 |
| Total | Wt % Siloxane | 2.0 | 2.0 | 2.0 | 1.5 | 2.5 | 3.0 | 0.0 |
| Formulation | Wt % Bromine | 10.4 | 13.0 | 15.6 | 18.2 | 13.0 | 10.4 | 10.4 |
| | Siloxane D Length | 45 | 45 | 45 | 45 | 30 | 30 | — |
| MVR-6 min | Cc/10 min. | 10.5 | 9.0 | 7.0 | 6.0 | 7.3 | 7.7 | 15.4 |
| Tg | ° C. | 159 | 163 | 167 | 171 | 164 | 161 | 158 |

TABLE 5-continued

| | | | | | | | | |
|---|---|---|---|---|---|---|---|---|
| NI-125 RT | Ductility | 0 | 0 | 0 | 0 | 0 | 100 | 0 |
| | J/m | 160.0 | 129.0 | 102.0 | 83.8 | 139 | 513.0 | 83.2 |
| | ft-lbs/in | 3.0 | 2.4 | 1.9 | 1.6 | 2.6 | 9.6 | 1.6 |
| MAI-RT | Ductility | 100 | 100 | 100 | 100 | 100 | 100 | 100 |
| Energy to max load-Avg | J | 73 | 73 | 71 | 73 | 58 | 72 | 69 |
| Energy to failure-Avg | J | 79 | 79 | 76 | 79 | 63 | 77 | 73 |
| Energy, Total-Avg | J | 79 | 79 | 76 | 79 | 63 | 77 | 73 |
| Density-Avg | | 1.281 | 1.307 | 1.329 | 1.360 | 1.305 | 1.277 | 1.291 |
| Specific Gravity-Avg | | 1.285 | 1.311 | 1.333 | 1.364 | 1.308 | 1.280 | 1.294 |
| HDT | 1.8 MPa | 136 | 140 | 142 | 143 | 136 | 131 | 139 |
| 2 Min OSU | Average | 27 | 23 | 20 | 34 | 32 | 40 | 28 |
| | Std. dev. | 6.7 | 3.1 | 0.6 | 2.3 | 2 | 2 | 10.1 |
| Peak OSU | Average | 47 | 45 | 42 | 38 | 33 | 42 | 54 |
| | Std. dev. | 2.5 | 3.1 | 3.5 | 3.5 | 2 | 1 | 8.1 |
| DsMax | Ave | 53 | 61 | 43 | 20 | 76 | 58 | 195 |
| | Std. dev. | 22 | 10 | 12 | 4 | 55 | 15 | 78 |
| % T at 62 mil (1.58 mm) | | | | | 75 | 79 | 87 | |
| YI | | | | | 22.5 | 12.0 | 5.1 | |
| % Haze | | | | | 14.6 | 12.1 | 6.6 | |
| YI at 125 mil (3.2 mm) | | 16 | 23 | 28 | | | | 2 |
| % T at 125 mil (3.2 mm) | | 79.9 | 72.9 | 63.9 | | | | 89.3 |
| % Haze at 125 mil (3.2 mm) | | 4.4 | 10.7 | 23.6 | | | | 0.6 |

88% while having an OSU flame value of 46, a peak heat release value of 55 and a DsMax smoke value of 30. EX 22 with 3.0 wt % siloxane and 10.4 wt % bromine that is formulated from a poly(siloxane-carbonate) having an average chain length of 30 polysiloxane units and about 6 wt % siloxane in the copolymer also shows excellent impact performance, transparency, haze and flame and smoke performance.

Transparent Compositions.

Formulations that pass the OSU and smoke testing and that have very high percent transmission values (greater than 85%), very low haze values (less than 2.5%) and low yellowness values (less than 6) are also possible to obtain using compositions of polysiloxane block copolycarbonates and brominated polycarbonate copolymers. Formulations with high transmission, low haze and low yellowness index values that pass OSU flame and smoke tests are particularly useful in window articles, gauge and dashboard covers and in window dust covers on aircraft. Formulations that meet the OSU flame and smoke and requirements and that have high percent transmissions, low haze and low yellowness index values can be obtained from a variety of polysiloxane block copolycarbonates with the brominated polycarbonate copolymer. Examples include EX 1, EX 2, EX 3 and EX 4 from Table 3 above prepared from a poly(siloxane-carbonate) having 10 polysiloxane repeating units and 1 wt % polysiloxane content in the copolymer; EX 5, EX 6, EX 7, and EX 8 from Table 4 above prepared from a poly(siloxane-carbonate) have 10 polysiloxane repeating units and 5 wt % polysiloxane content in the copolymer; EX 13 and EX 14 from Table 5 above prepared from a poly(siloxane-carbonate) have 45 polysiloxane repeating units and 6 wt % polysiloxane content in the copolymer and EX 22 from Table 5 above prepared from a poly(siloxane-carbonate) have 30 polysiloxane repeating units and 6 wt % polysiloxane content in the copolymer. The yellowness index generally increases as the wt % of brominated copolycarbonate in the compositions increases, the percent haze generally increases as the wt % polysiloxane in the composition increases and the chain length of the polysiloxane increases (30 and 45 polysiloxane chain lengths are worse than 10 polysiloxane chain lengths) and the % polysiloxane in the copolymer increases (20 wt % polysiloxane in the copolymer is much worse than 6 wt % polysiloxane) The results further suggest that the poly(siloxane-carbonate) providing the best transparency, haze and YI values and yellowness index values for use in window applications is the poly(siloxane-carbonate) having approximately 10 polysiloxane repeating units and 1 wt % polysiloxane content in the copolymer.

Low OSU Heat Release, Low Smoke, TiO$_2$-Containing Compositions.

Titanium dioxide is a common additive used to increase the whiteness of polymer compositions. Compositions having poly(siloxane-carbonate) and brominated copolycarbonate were prepared that also contained various amounts of titanium dioxide in order to determine its effect on density and stability of the polycarbonate compositions. The results are shown in Table 6.

TABLE 6

| Blend Composition Components | | EX 23 | EX 24 | EX 25 | EX 26 | EX 27 | EX 28 | EX 29 |
|---|---|---|---|---|---|---|---|---|
| TBBPA-BPA | | 40.0 | 40.0 | 40.0 | 40.0 | 40.0 | 40.0 | 40.0 |
| SiPC 4 | | 50.00 | 50.00 | 50.00 | 50.00 | 50.00 | 50.0 | 50.00 |
| PC 1 | | 10.0 | 10.0 | 10.00 | 10.00 | 10.00 | 10.0 | 10.0 |
| TiO$_2$ | | 0.0 | 1.0 | 2.0 | 3.0 | 4.0 | 5.0 | 7.0 |
| IRGAPHOS 168 | | 0.06 | 0.06 | 0.06 | 0.06 | 0.06 | 0.06 | 0.06 |
| Total Formulation | Total wt % Siloxane | 3.00 | 3.00 | 3.0 | 3.00 | 3.00 | 3.00 | 3.00 |
| | Total wt % Bromine | 10.4 | 10.4 | 10.4 | 10.4 | 10.4 | 10.4 | 10.4 |
| MVR-6 min | | 8.2 | 8.7 | 8.86 | 8.69 | 8.44 | 8.52 | 8.46 |
| MVR-18 min | | 8.8 | 9.3 | 9.73 | 9.73 | 9.90 | 10.40 | 10.00 |
| % MVR Change 6 min to 18 min | | 7.0 | 12.9 | 18.1 | 18.1 | 20.1 | 26.2 | 21.4 |

TABLE 6-continued

| Blend Composition Components | | EX 23 | EX 24 | EX 25 | EX 26 | EX 27 | EX 28 | EX 29 |
|---|---|---|---|---|---|---|---|---|
| NI-125 RT | Ductility | 100 | 100 | 100 | 100 | 100 | 100 | 100 |
| | J/m | 577 | 608 | 592 | 544 | 515 | 520 | 487 |
| | ft-lbs/in | 10.8 | 11.4 | 11.1 | 10.2 | 9.6 | 9.7 | 9.1 |
| Density-Avg | g/cc | 1.278 | 1.282 | 1.287 | 1.305 | 1.316 | 1.319 | 1.340 |
| Specific Gravity-Avg | | 1.281 | 1.286 | 1.290 | 1.308 | 1.319 | 1.322 | 1.343 |

The data in Table 6 illustrate that melt stability decreases as the $TiO_2$ content increases (EX 24-EX 29) compared to a control that has no TiO2 present (EX 23) as measured by the change in the MVR values after 6 and 18 minute heating at 300° C. To achieve 20% or less melt change, then 4 PHR or less TiO2 can be used in the polycarbonate compositions (EX 24-EX 26 vs. EX 27-EX 29).

The data in Table 7 shows the effect of $TiO_2$ on the smoke density performance of a composition with and without poly(siloxane-carbonate) present.

TABLE 7

| Component, Properties | | CEX 10 | EX 30 |
|---|---|---|---|
| TBBPA-BPA Copolymer | | 40.0 | 40.0 |
| SiPC 4 | | 0.00 | 50.00 |
| PC 1 | | 60.0 | 10.0 |
| TiO₂ | | 2.0 | 2.0 |
| IRGAPHOS 168 | | 0.060 | 0.060 |
| Formulated Blend | Total wt % Siloxane | 0 | 3 |
| Composition | Total wt % Bromine | 10.4 | 10.4 |
| MVR-6 min | | 17.7 | 9.5 |
| MVR-18 min | | 18.6 | 10.4 |
| MVR, % Change | | 5.1 | 9.6 |
| Tg | | 160 | 161 |
| NI-125 RT | Ductility | 0.0 | 100.0 |
| | J/m | 87.7 | 467.0 |
| | ft-lbs/in | 1.6 | 8.7 |
| MAI-RT | Ductility | 100 | 100 |
| Energy to max load-Average | J | 72 | 70 |
| Energy to failure- Average | J | 76 | 76 |
| Energy, Total- Average | J | 76 | 76 |
| Density-Avg | g/cc | 1.304 | 1.293 |
| Specific Gravity-Average | | 1.308 | 1.296 |
| FAA Smoke Density | Average | 231.0 | 72.0 |
| Ds at 4 min | Standard deviation | 78.2 | 43.6 |

The results in Table 7 show that the ability of poly(siloxane-carbonate)s in the compositions to reduce smoke is not diminished by the presence of $TiO_2$ in the compositions, even though it is known in the art that TiO2 can improve polycarbonate flame performance. Even with 2 PHR TiO2 present, without any poly(siloxane-carbonate), CEX 10 does not pass the DsMax smoke target of less than 200, having a value of 231. By contrast EX 30 (with poly(siloxane-carbonate) present) passes the DsMax test target value of less than 200 with a value of only 72.

Furthermore the impact performance of molded parts from compositions containing TiO2 is improved by the presence of a poly(siloxane-carbonate) as illustrated by Ex 24-29 in Table 6 and EX 30 in Table 7 (which show 100% ductility performance at room temperature) while CEX 10 has 0% ductility performance at room temperature.

Density of Low OSU Heat Release, Low Smoke Polycarbonate Compositions.

The density results in Tables 3-5 illustrate the factors that most strongly affect the density of the compositions that do not contain titanium dioxide. The strongest influence on density is the wt % of bromine in the polycarbonate compositions. For example in CEX 2, 3, 4, 5, and 6 in Table 3 the wt % bromine increases from 0 to 13 wt % and the density increases from 1.198 to 1.315 g/cc. A similar trend is shown in Table 4 where the wt % bromine increases from 0 to 26 wt % and the density increases from 1.183 to 1.450. The results in Table 5 above also illustrate that increasing the amount of siloxane in the compositions does slightly decrease the density in the compositions. For example, the wt % bromine is the same in CEX 10 and EX 13-EX 15 at 10.4 wt %, but the wt % siloxane increases from 0 to 2.0 wt % and the density decreases from 1.291 to 1.277 g/cc. The chain length of siloxane or the wt % siloxane in the poly(siloxane-carbonate) does not show a large influence in the density based on the results in Table 5. In order to obtain a density below the targeted maximum density of 1.320 g/cc for aircraft applications, it appears that less than 15 wt % bromine can be used.

The presence of titanium dioxide further increases the density of the compositions as illustrated in Table 6. In Table 6, compositions are shown having 3.0 wt % siloxane and 10.4 wt % bromine contents and increasing amounts of titanium dioxide. In EX 23-29 the PHR titanium dioxide increases from 0 wt % to 7 PHR and the density increases from 1.278 to 1.340 g/cc. Therefore in order to achieve a maximum density of less than 1.320 g/cc, less than 5 PHR titanium dioxide can be used in the compositions shown in Table 6.

Combining the results from the various Tables shows achieving the targeted density maximum of 1.320 g/cc for aircraft applications can be accomplished by balancing the amount of titanium dioxide with the amount of brominated copolycarbonate. Bromine contents of less than 13 wt % and titanium contents of less than 5 wt % can be used to meet the aircraft density targets for white product compositions (EX 24-EX 27 vs. EX 28-EX 29).

Alternative Bromine Sources.

Property comparisons were made between polycarbonate compositions having similar wt % polysiloxane and similar wt % bromine in the compositions using three different bromine-containing additives, in particular a brominated epoxy oligomer (F3100 from ICL Industrial Products, EX 30), a brominated polycarbonate oligomer (BC52, EX 31) and a brominated copolycarbonate(TBBPA-BPA copolymer, EX 32). The results are shown in Table 8.

TABLE 8

| | | EX 31 | EX 32 | EX 33 |
|---|---|---|---|---|
| Components | | | | |
| SiPC 4 | | 50.0 | 50.0 | 50.0 |
| PC 2 | | 30.70 | 30.00 | 20.00 |
| F-3100 | | 19.300 | — | — |
| BC52 | | — | 20.0 | — |
| TBBPA-BPA Copolymer | | — | — | 40.000 |
| Phosphite | | 0.060 | 0.060 | 0.060 |
| Mw of Br compound | | 15,000 | 2,665 | 22,500 |
| Softening Temp C. | | 200 | 171 | 182 |
| Total | % | 3 | 3 | 2.7 |
| Formulation | Siloxane | | | |
| | % | 10.4 | 10.4 | 9.5 |
| | Bromine | | | |
| | D length | 45.0 | 45.0 | 45.0 |

TABLE 8-continued

|  |  | EX 31 | EX 32 | EX 33 |
|---|---|---|---|---|
| Properties |  |  |  |  |
| MVR-6 |  | 15.7 | 11.8 | 8.3 |
| % Change |  | 17.5 | 4.9 | 11.9 |
| Tg |  | 146.5 | 151.4 | 159.8 |
| NI-125 RT | Ductility | 100.00 | 0.0 | 100.0 |
|  | J/m | 773.0 | 123.0 | 744.0 |
|  | ft-lbs/in | 14.5 | 2.3 | 13.9 |
| MAI-RT | Ductility | 100.0 | 100.0 | 100.0 |
| Energy to max load-Avg | J | 68.1 | 75.1 | 78.4 |
| Energy to failure-Avg | J | 72.6 | 79.8 | 85.0 |
| Energy, Total-Avg | J | 72.6 | 79.8 | 85.1 |
| Density-Avg | g/cc | 1.282 | 1.273 | 1.268 |
| Specific Gravity-Avg |  | 1.285 | 1.276 | 1.271 |
| HDT-ASTM-G | 1.8 MPa | 123.8 | 127.7 | 135.2 |
| HDT-ASTM-G | 0.455 MPa |  |  |  |
| OSU 2 min. | TTF | 42.4 | 30.1 | 36.4 |
|  |  | 45.8 | 24.0 | 26.2 |
|  |  | 33.8 | 21.8 | 18.2 |
|  | Average | 40.7 | 25.3 | 26.9 |
|  | Standard deviation | 6.2 | 4.3 | 9.1 |
| OSU Peak |  | 50.5 | 50.5 | 60.3 |
|  |  | 50.8 | 43.1 | 49.5 |
|  |  | 59.5 | 60.2 | 54.6 |
|  | Average | 53.6 | 51.3 | 54.8 |
|  | Standard deviation | 5.1 | 8.6 | 5.4 |
| FAA Smoke Density |  |  |  |  |
| Ds at 4 min |  | 96.6 | 23.81 | 20.5 |
|  |  | 66.3 | 35.3 | 18.2 |
|  |  | 88.6 | 16.6 | 42.7 |
|  | Average | 83.8 | 26.0 | 27.1 |
|  | Standard deviation | 15.7 | 13.2 | 13.5 |
| Dmax |  |  |  |  |
|  |  | 96.8 | 23.81 | 20.5 |
|  |  | 66.3 | 35.3 | 18.2 |
|  |  | 88.6 | 16.6 | 42.7 |
|  | Ave | 83.9 | 26.0 | 27.1 |
|  | Standard deviation | 15.7 | 13.2 | 13.5 |
| Optical Properties |  |  |  |  |
| % T at 125 mil (3.2 mm) |  | 22.0 | 78.7 | 77.3 |
| YI |  | 62.7 | 19.1 | 19.8 |
| % Haze |  | 102.6 | 7.3 | 6.5 |

The results in Table 8 show that the targeted flame and smoke properties (2-min total heat release and peak heat values of less than 65 and a smoke Dmax value of less than 200) were achieved in polycarbonate compositions containing siloxane using the different sources of bromine as flame retardants. The high impact values in EX 31 (100% ductility in the notched Izod test) as compared to EX 32, illustrates the importance of selecting a bromine composition with an $M_w$ of at least approximately 15,000 when formulations of high toughness are needed. High transparency (greater than 75%) and low haze (less than 10%) were also found with EX 32. In addition, all three of the compositions showed density values below the 1.320 g/cc upper limit.

Other Additives

The effect of additives often used as flame retardants in polycarbonate, on the smoke density properties of compositions made from combinations of the poly(siloxane-carbonate) and brominated copolycarbonate, were also investigated and the results are shown in Table 9.

When used at levels commonly employed to improve flame performance, improve the color stability, or reduce haze in polycarbonates, the additives showed no effect on the flame retardant performance of the polycarbonate compositions. EX 34 (with $TiO_2$) possessed a similar $D_{max}$ value to EX 35-39 (with the flame retardant, color stabilization, or haze reducing additives) (EX 34 had a $D_{max}$ of 21, whereas the highest $D_{max}$ values measured for the compositions of Table 9 was 29).

TABLE 9

| Name |  | EX 34 | EX 35 | EX 36 | EX 37 | EX 38 | EX 39 |
|---|---|---|---|---|---|---|---|
| TBBPA-BPA |  | 40.0 | 40.0 | 40.0 | 40.0 | 40.0 | 40.0 |
| SiPC 4 |  | 50.00 | 50.00 | 50.00 | 50.00 | 50.00 | 50.00 |
| PC 1 |  | 10.0 | 10.0 | 10.0 | 10.0 | 10.0 | 10.0 |
| KSS |  | — | 0.30 | — | — | — | — |
| KSS |  | — | 0.30 | — | — | — | — |
| Rimar salt |  | — | — | 0.08 | 0.08 | — | — |
| Octaphenylcyclotetrasiloxane |  | — | — | — | 0.10 | — | — |
| STB |  | — | — | — | — | 0.75 | — |
| Phosphorus acid solution (0.15%) |  | — | — | — | — | — | 0.10 |
| $TiO_2$ |  | 2.00 | 2.00 | 2.00 | 2.00 | 2.00 | 2.00 |
| Phosphite |  | 0.06 | 0.06 | 0.06 | 0.06 | 0.06 | 0.06 |
| Total Formulation | Wt % Siloxane | 3.0 | 3.0 | 3.0 | 3.0 | 3.0 | 3.0 |
|  | Wt % Bromine | 10.4 | 10.4 | 10.4 | 10.4 | 10.4 | 10.4 |
| Properties |  |  |  |  |  |  |  |
| MVR-6 | Cc/10 min | 9.6 | 10.0 | 12.4 | 13.6 | 10.4 | 9.9 |
| Tg | °C. | 159 | 157 | 160 | 159 | 160 | 160 |
| NI-125 RT | Ductility | 100 | 100 | 100 | 100 | 0 | 100 |
|  | J/m | 588.0 | 544.0 | 534.0 | 596.0 | 143.0 | 498.0 |
|  | ft-lbs/in | 11.0 | 10.2 | 10.0. | 11.2 | 2.7 | 9.3 |
| Density-Avg | g/cc | 1.287 | 1.291 | 1.291 | 1.288 | 1.293 | 1.291 |
| Specific Gravity-Avg |  | 1.290 | 1.294 | 1.294 | 1.291 | 1.296 | 1.294 |
| HDT-ASTM-G | 1.8 MPa | 134 | 134 | 134 | 134 | 134 | 135 |

Other Silicone-Containing Additives.

The impact of replacing the polysiloxane block copolycarbonate with other silicone-containing additives was also investigated and the results shown in Table 10.

TABLE 10

|  |  | CEX 11 | CEX 12 | CEX 13 | CEX 14 |
|---|---|---|---|---|---|
| Components |  |  |  |  |  |
| TBBPA-BPA |  | 30.00 | 30.00 | 30.00 | 30.00 |
| PC 2 |  | 70.00 | 69.50 | 69.50 | 69.50 |
| DF1040 |  |  | 0.50 |  |  |
| OPTS |  |  |  | 0.50 |  |
| D4 |  |  |  |  | 0.500 |
| Phosphite |  | 0.060 | 0.060 | 0.060 | 0.060 |
| Total Formulation | Wt % Siloxane | 0 | 0.5 | 0.5 | 0.5 |
|  | Wt % Bromine | 7.8 | 7.8 | 7.8 | 7.8 |
| Properties |  |  |  |  |  |
| MVR-6 |  | 5.5 | 5.9 | 5.5 | 5.6 |
| NI-125 RT | Ductility | 0.0 | 0.0 | 0.0 | 0.0 |
|  | J/m | 139 | 148 | 132 | 135 |
|  | ft-lbs/in | 2.6 | 2.8 | 2.5 | 2.5 |
| Density-Avg | g/cc | 1.262 | 1.263 | 1.264 | 1.264 |
| Specific Gravity-Avg |  | 1.265 | 1.267 | 1.267 | 1.267 |
| HDT-ASTM-G | 1.8 MPa | 136 | 135 | 136 | 135 |
| OSU Test FAR 25.853 (d) Appendix F, Part IV |  |  |  |  |  |
| 2 Min OSU | Average | 17 | 59 | 19 | 28 |
|  | Standard deviation | 9.7 | 2.6 | 20.2 | 15.9 |
| Peak OSU | Average | 60 | 75 | 65 | 65 |
|  | Standard deviation | 4.5 | 4.0 | 3.8 | 8.7 |
| NBS Smoke Density (ASTM F814/E662, Flaming Mode) |  |  |  |  |  |
| DS Max | Ave | 529 | 306 | 521 | 406 |
|  | Standard deviation | 84 | 197 | 219 | 199 |

The results in Table 10 show that none of the siloxane sources performed as well as the poly(siloxane-carbonate) of the invention. The results for EX 3 and EX 4 from Table 3 (with 0.4 wt % polysiloxane content and either 7.8 or 10 wt % bromine) show that both pass the OSU heat release and smoke tests, with values less than 65 for the OSU tests and less than 200 for the smoke tests. In contrast CEX 12, 13, and 14 have slightly higher amounts of siloxane (0.5 wt %) and the same amount of bromine (7.8 wt %) and fail the smoke tests with DsMax values of 300 or greater. These other sources of silicone are therefore much less effective at suppressing smoke in the smoke tests than poly(siloxane-carbonate) described herein. While not wishing to be bound by any specific theory, it is believed that providing the siloxane in a less volatile, less mobile (higher Tg), high molecular weight polymer could help to maintain the siloxane in the composition longer and keep the siloxane better dispersed during burning.

Color Stability and Weathering Performance.

Materials used in the transportation industry, especially those that pass the OSU and DsMax smoke requirements, often have poor stability when exposed to outdoors light. Thus manufactures must either paint the finished part or risk the yellowing or other discoloration of the parts. In order to demonstrate the improved color stability performance of the poly(siloxane-carbonate) and brominated copolycarbonate compositions over those found in art, the compositions were formulated with and without UV stabilization additives in a bright white color package. These compositions and results are shown in Table 11.

TABLE 11

|  |  | EX 40 | EX 41 | EX 42 | EX 43 |
|---|---|---|---|---|---|
| Component |  |  |  |  |  |
| TBBPA-BPA |  | 40.0 | 40.0 | 40.0 | 40.0 |
| SiPC 4 |  | 50.00 | 50.00 | 50.00 | 50.00 |
| PC 1 |  | 10.0 | 10.0 | 10.0 | 10.0 |
| Tinuvin 1577 |  | 0 | 0.3 | — | — |
| UVA 234 |  | — | — | 0.300 | — |
| Cyasorb 3638 |  | — | — | — | 0.3 |
| TiO$_2$ |  | 2.0 | 2.0 | 2.0 | 2.0 |
| IRGAPHOS 168 |  | 0.060 | 0.060 | 0.060 | 0.060 |
| Total Formulation | Total wt % Siloxane | 3.00 | 3.00 | 3.00 | 3.00 |
|  | Total wt % Bromine | 10.4 | 10.4 | 10.4 | 10.4 |
| Properties |  |  |  |  |  |
| MVR-6 minutes |  | 8.9 | 8.7 | 9.4 | 9.0 |
| MVR-18 minutes |  | 8.9 | 11.2 | 10.6 | 9.0 |
| NI-125 RT | Ductility | 100 | 100 | 100 | 100 |
|  | J/m | 566 | 542 | 539 | 525 |
|  | ft-lbs/in | 10.6 | 10.1 | 10.1 | 9.8 |
| OSU 2 min. | TTF | 26.0 | 21.3 | 23.0 | 18.3 |
|  | 60 mil | 19.0 | 17.6 | 25.1 | 21.6 |
|  |  | 21.0 | 23.8 | 25.7 | 23.4 |
|  | Average | 22.0 | 20.9 | 24.6 | 21.1 |
|  | Standard Deviation | 3.6 | 3.1 | 1.4 | 2.6 |
| OSU | TTF | 44.0 | 44.7 | 45.1 | 38.4 |
|  | 60 mil | 43.2 | 41.8 | 47.3 | 49.4 |
|  |  | 44.5 | 43.0 | 44.3 | 48.3 |
|  | Average | 43.9 | 43.2 | 45.6 | 45.3 |
|  | Standard Deviation | 0.7 | 1.5 | 1.5 | 6.0 |
| FAA Smoke De Ds at 4 minutes | TTF | 11.5 | 16.4 | 21.1 | 25.00 |
|  | 60 mil | 10.7 | 16.8 | 22.0 | 22.5 |
|  |  | 11.5 | 27.3 | 23.5 | 20.8 |
|  | Ave | 11.2 | 20.2 | 22.2 | 22.8 |
|  | Standard Deviation | 0.4 | 6.2 | 1.2 | 2.1 |
| DsMax | TTF | 11.5 | 16.4 | 21.3 | 25.0 |
|  | 60 mil | 10.7 | 16.8 | 22.0 | 22.5 |
|  |  | 11.5 | 27.3 | 23.5 | 20.8 |
|  | Ave | 11.2 | 20.2 | 22.3 | 22.8 |
|  | Standard Deviation | 0.4 | 6.2 | 1.1 | 2.1 |

All of the compositions were 100% ductile in notched Izod testing, have a density requirement of less than 1.320 g/cc (data not shown), and all showed passing values in the OSU heat release and smoke testing, with OSU values below 65 and smoke Dmax values below 200.

Bright white sample plaques were placed on a 45 degree angle south facing rack exposed to an unobstructed sunlight light exposure for 466 hours and then tested for a color shift by measuring the reflected light of the light-exposed plaques using a spectrophotometer. The color stability/weathering results are shown in Table 12.

TABLE 12

| Outdoor Exposure, Hrs | Comparative (a) No UVA DE | EX 40 No UVA DE | EX 41 Tinuvin 1577 DE | EX 42 UVA234 DE | EX 43 Cyasorb 3638 DE |
|---|---|---|---|---|---|
| 0 | — | — | — | — | — |
| 110 | 5.9 | 0.3 | 0.3 | 0.5 | 0.5 |
| 466 | 7.9 | 0.7 | 0.6 | 0.4 | 0.3 |

(a) White LEXAN* FST9705 plaque.
*Trademark of SABIC Innovative Plastics IP BV

All four of the samples (EX 40-43) of the present invention have better color stability than the existing commercial OSU comparative resin. All three of the samples containing UV stabilizing additives showed even lower tendency to yellow as determined by lower DE values than the sample or the sample with no UV stabilizers, even after 466 hours. The benefits in color stability of the compositions of the present invention compared to a composition that has comparable OSU smoke and flame performance but employs polyarylate poly(siloxane-carbonate)s in the composition (LEXAN*FST 9705 polymer) is also illustrated by comparing the DE values of EX 40 with FST 9705 after 466 hours of weathering (neither sample contained UV stabilization additive). The FST 9705 showed much higher DE values than CEX 15 (DE 7.9 vs. 0.7).

Materials used in the following examples of the poly(siloxane-etherimide) compositions are listed Table 13. Amounts in these Examples are in parts by weight per hundred parts by weight of the total amount of polymer otherwise noted.

TABLE 13

| Component | Description | Source |
|---|---|---|
| PC | LEXAN 100 grade | Sabic Innovative Plastics |
| PEI-Siloxane | A random poly(etherimide-dimethylsiloxane) copolymer comprising structural units derived from m-phenylene diamine, BPADA, and an aminopropyl terminated polydimethylsiloxane containing on average 10 silicon atoms, with 37 ± 2 wt. % siloxane content; Mw about 38,500 amu determined by GPC relative to PC standards (SILTEM ® D9000) | Sabic Innovative Plastics |
| TBBPA-BPA | BPA and tetrabromo-BPA (50/50 wt %) was used, Mw = 23,100 | |

The examples were prepared on 30 mm Werner Pfleiderer twin extruders as follows. All components were dry blended for about 4 minutes using a paint shaker or a drum tumbler. The twin screw extruder contained a vacuum port located near die face. The compositions were compounded with an applied vacuum of 20+ inches of Hg, and chopped into pellets after cooling in a water bath.

The compositions are molded after drying at 121° C. for 4 hrs on a 260-ton (236 metric ton) Van Dorn or an 85 Ton Van Dorn molding machine operating at 300 to 320° C. with a mold temperature of 80° C. It will be recognized by one skilled in the art that the method is not limited to these temperatures or processing equipment.

All the performance tests were conducted as described above.

Comparative Examples 44 and 45

Comparative examples 1 and 2 show that synergy between siloxane containing-resins and bromine-containing resins to achieve low heat release and low smoke density is not known in the art. In accordance with US Publ. 2007/0129492 (U.S. Pat. No. 7,790,292, from EX2-15), a siloxane-containing poly(ester-carbonate) copolymer was compared to a commercial composition containing the siloxane-containing poly(ester-carbonate) copolymer and 12 wt % of a bromine-containing polycarbonate copolymer. Results are shown in Table 14.

TABLE 14

| Component | | CEX44 | CEX45 |
|---|---|---|---|
| Poly(ester-carbonate) copolymer | | 100 | 88 |
| TBBPA-BPA Copolymer | | 0 | 12.0 |
| Total | Total wt % Siloxane | 1 | 0.88 |
| Formulation | Total wt % Bromine | 0 | 3.1 |
| NBS Smoke Density ASTM F814/E662 | | | |
| Ds at 1.5 min | | 1 | n/a |
| Ds at 4.0 min | | 23 | 25 |
| DsMax | | 23 | 25 |
| DsMax time | | 3.98 | 4 |

The data shows that the addition of the bromine copolymer to the siloxane containing poly(ester-carbonate) does not yield improved smoke performance, as in general, the results are no better or worse than the siloxane-containing poly(ester-carbonate) without the brominated polymer.

Further according to US 2007/0129492, high arylate ester levels and low polycarbonate levels are needed to pass the OSU test. In contrast, the data below shows that when using the composition of this invention, no arylates are needed to obtain good OSU heat release values.

Examples 46-49

Figure 2:
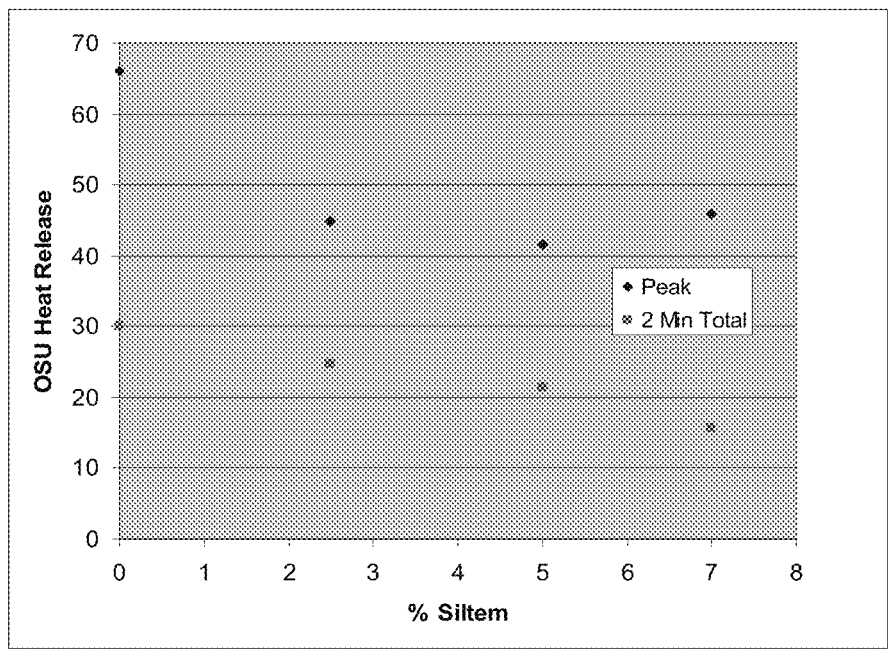
FIG. 2 is a plot showing the effect of poly(etherimide-siloxane) concentration on OSU heat release.

These Examples show the synergistic effect of siloxane from a poly(etherimide-siloxane) and a brominated polymer on heat release and smoke density in polycarbonate compositions. Results are shown in Table 15. Results showing the effect of poly(etherimide-siloxane) concentration on DsMax are plotted in the FIG. 1, and results showing the effect of poly(etherimide-siloxane) concentration on OSU heat release are plotted in FIG. 2.

TABLE 15

| | | EX46 | EX47 | EX48 | CEX49 |
|---|---|---|---|---|---|
| Components | | | | | |
| TBBPA-BPA | | 40.00 | 40.00 | 40.00 | 40.00 |
| SILTEM | | 7.00 | 5.00 | 2.50 | 0.00 |
| PC | | 53.0 | 55.0 | 57.5 | 60.0 |
| Additive | | 0.06 | 0.06 | 0.06 | 0.0 |
| Total Formulation | Wt % Siloxane | 2.6 | 1.9 | 0.9 | 0.0 |
| | Wt % Bromine | 10.4 | 10.4 | 10.4 | 10.4 |
| Properties | | | | | |
| MVR 6 minutes | | 5.5 | 5.6 | 5.7 | 6.8 |
| NI-125, RT | Ductility | 0.0 | 0.0 | 0.0 | 0.0 |
| | J/m | 130 | 119 | 117 | 90.8 |
| | ft-lbs/in | 2.4 | 2.2 | 2.2 | 1.7 |
| MAI, RT | Ductility | 100 | 100 | 100 | 100 |
| Energy to max | J | 75.0 | 75.8 | 78.2 | 78.1 |
| Energy to failure | J | 81.6 | 81.8 | 83.6 | 84.3 |
| Energy, Total-A | J | 81.7 | 81.9 | 83.7 | 84.3 |
| Density, average | g/cc | 1.285 | 1.286 | 1.287 | 1.289 |
| HDT-ASTM-G | 1.8 MPa | 138.4 | 139.7 | 139.7 | 141.5 |
| OSU Test FAR 25.853 (d) Appendix F, Part IV | | | | | |
| 2 Min OSU | Average | 17 | 21 | 25 | 30 |
| | Standard deviation | 9.74 | 6 | 7 | 3 |

TABLE 15-continued

|  |  | EX46 | EX47 | EX48 | CEX49 |
|---|---|---|---|---|---|
| Peak OSU | Average, TTF | 46 | 41 | 45 | 66 |
|  | Standard deviation | 11 | 6 | 3 | 8 |
| NBS Smoke Density (ASTM F814/E662, Flaming Mode) |  |  |  |  |  |
| DsMax | Average, TTF | 10 | 13 | 22 | 457 |
|  | Standard deviation | 1 | 6 | 8 | 243 |
| Optical properties |  |  |  |  |  |
| YI |  | 9.8 | 8.2 | 5.6 | 7.1 |
| % T at 125 mil |  | 67.6 | 70.6 | 79.7 | 86.5 |
| % Haze |  | 48.5 | 34.0 | 10.9 | 0.7 |

A series of blends using a poly(etherimide-siloxane) block copolymer, a brominated polymer, and polycarbonate (EX 46-EX 48) were made and compared to the control with no siloxane (CEX 49). Without the poly(etherimide-siloxane) block copolymer, the smoke levels are above the FAA's acceptable limit of 200 for DsMax and have a high standard deviation in the E662 test (Table 14 and FIG. 1). The peak heat release rate in the OSU test is also above the FAA's acceptable limit of 65. With the addition of the poly(etherimide-siloxane), the smoke levels drop dramatically and are consistently below 25 with a low standard deviation (Table 14 and FIG. 2). Again with the addition of the poly(etherimide-siloxane), the peak OSU values drop and are consistently 20 points below the FAA standard of 65.

In addition, the compositions have improved toughness over the control (CEX 49). The control has an impact value of less than 2 ft-lbs/in; whereas EX 46-EX 48 have impacts over 2 ft-lbs/in. All compositions are 100% ductile in MAI testing at room temperature.

Ranges disclosed herein are inclusive and combinable (e.g., ranges of "up to 25 wt %, or, more specifically, 5 wt % to 20 wt %," is inclusive of the endpoints and all intermediate values of the ranges of "5 wt % to 25 wt %," etc.). "Combination" is inclusive of compositions, blends, mixtures, alloys, reaction products, and the like. Furthermore, the terms "first," "second," and the like do not denote any order, quantity, or importance, but rather are used to distinguish one element from another, and the terms "a" and "an" herein do not denote a limitation of quantity, but rather denote the presence of at least one of the referenced item. Reference throughout the specification to "an embodiment", "another embodiment", "an embodiment," and so forth, means that a particular element (e.g., feature, structure, and/or characteristic) described in connection with the embodiment is included in at least an embodiment described herein, and can or can not be present in other embodiments. In addition, it is to be understood that the described elements can be combined in any suitable manner in the various embodiments. The suffix "(s)" as used herein is intended to include both the singular and the plural of the term that it modifies, thereby including at least one of that term (e.g., the colorant(s) includes at least one colorants).

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl. The term "hydrocarbon group" encompasses groups containing the specified number of carbon atoms and having carbon, hydrogen, and optionally one to three heteroatoms selected from O, S, P, and N. Hydrocarbon groups can contain saturated, unsaturated, or aromatic moieties, or a combination comprising any of the foregoing, e.g., an alkyl moiety and an aromatic moiety. Hydrocarbon groups can be halogenated, specifically chlorinated, brominated, or fluorinated, including perfluorinated. The term "aromatic group" includes groups having an aromatic moiety, optionally together with a saturated or unsaturated moiety.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

We claim:
1. A composition comprising:
a first polymer comprising a poly(etherimide-siloxane) copolymer comprising (a) a repeating polyetherimide unit, and (b) a repeating poly(siloxane) block unit, the poly(siloxane) block unit having the formula:

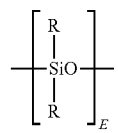

wherein
R is each independently a $C_1$-$C_{30}$ hydrocarbon group, and
E has an average value of 5 to 200;
a second polymer different from the first polymer and comprising bromine; and
an optional one or more polymers comprising a polycarbonate different from the second polymer;
wherein
the composition is free of copolymers comprising carbonate units and ester units,
the wt % of the first polymer, second polymer, and optional one or more polymers sum to 100 wt %, siloxane units are present in the composition in an amount of 0.3 to 3.5 wt %, based on the sum of the wt % of the first, second, and optional one or more polymers, and bromine is present in the composition in an amount of 7.8 wt % to 13 wt %, based on the sum of the wt % of the first, second, and optional one or more polymers; and further wherein an article molded or formed from the composition has an OSU integrated 2 minute heat release test value of less than 65 kW-min/m² and a peak heat release rate of less than 65 kW/m² as measured using the method of FAR F25.4, in accordance with Federal Aviation Regulation FAR 25.853 (d), and an E662 smoke test Dmax value of less than 200 when measured at a thickness of 1.6 mm.

2. The composition of claim 1, wherein the polysiloxane unit of the first polymer is derived from a polysiloxane diamine of the formula:

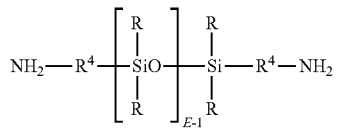

wherein

R is each independently a $C_1$-$C_{12}$ hydrocarbon group, $R^4$ is each independently a $C_2$-$C_{20}$ hydrocarbon group, and E has an average value of 5 to 100.

3. The composition of claim 2, wherein

R is each independently a $C_1$-$C_6$ hydrocarbon group, $R^4$ is each independently a $C_2$-$C_6$ alkyl group, and E has an average value of 5 to 80.

4. The composition of claim 2, wherein R is methyl, $R^4$ is 1,3-propylene, and E is 5 to 100.

5. The composition of claim 1, wherein the polysiloxane unit of the first polymer is derived from a polysiloxane dianhydride of formulas:

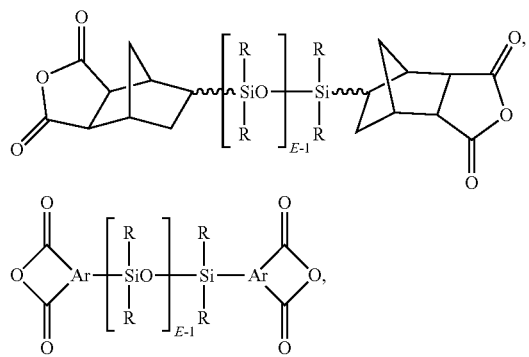

or a combination thereof, wherein

R is each independently a $C_1$-$C_{12}$ hydrocarbon group,

Ar is a $C_6$-$C_{30}$ aromatic group, and

E has an average value of 5 to 200.

6. The composition of claim 1, wherein the polysiloxane unit of the first polymer is present in an amount of at least 2.0 wt %, based on the weight of the first polymer.

7. The composition of claim 1, wherein the polyetherimide unit comprises a unit of the formula:

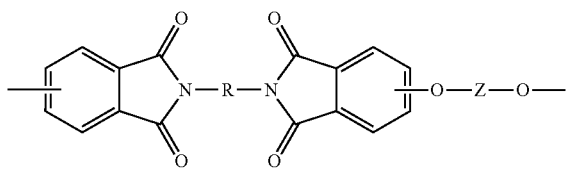

wherein

R is a $C_{6-20}$ aromatic hydrocarbon group or halogenated derivative thereof, a straight or branched chain $C_{2-20}$ alkylene group or halogenated derivative thereof, a $C_{3-20}$ cycloalkylene group or halogenated derivative thereof; and Z is an aromatic $C_{6-24}$ monocyclic or polycyclic moiety optionally substituted with 1 to 6 $C_{1-8}$ alkyl groups, 1 to 8 halogen atoms, or a combination thereof.

8. The composition of claim 7, wherein in the polyetherimide unit,

R is a group of the formula:

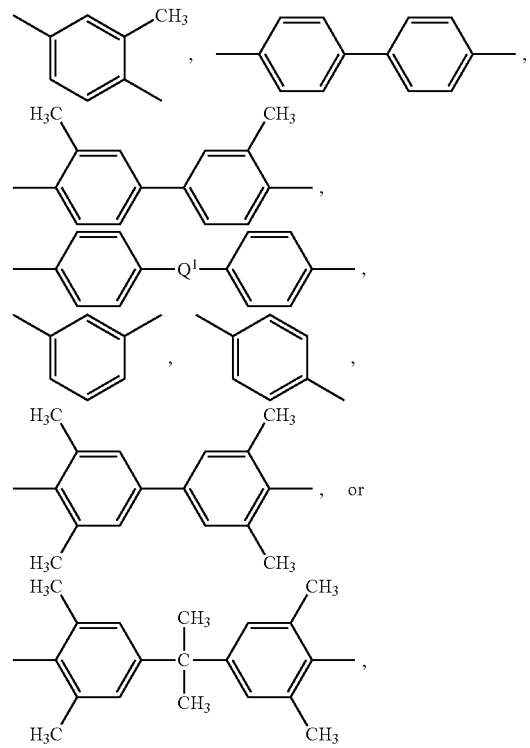

wherein $Q^1$ is —O—, —S—, —C(O)—, —SO$_2$—, —SO—, or —$C_yH_{2y}$— or a halogenated derivative thereof wherein y is an integer from 1 to 5; and Z is a group of the formula:

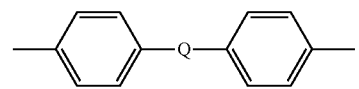

wherein Q is —O—, —S—, —C(O)—, —SO$_2$—, —SO—, or —C$_y$H$_{2y}$— or a halogenated derivative thereof wherein y is an integer from 1 to 5.

9. The composition of claim 8, wherein in the polyetherimide unit R is m-phenylene, p-arylene diphenylsulfone, or a combination comprising at least one of the foregoing, and Z is 2,2-(4-phenylene)isopropylidene.

10. The composition of claim 1, wherein the bromine is present in the second polymer in an amount of at least 30 wt %, based on the weight of the second polymer.

11. The composition of claim 1, wherein the second polymer is a brominated polycarbonate.

12. The composition of claim 11, wherein the brominated polycarbonate comprises 25 to 35 mol % of units derived from 2,2'6,6'tetrabromo-4,4'isopropylidienediphenol and 65 to 75 mole % of units derived from Bisphenol A.

13. The composition of claim 1, wherein the brominated polymer is a brominated epoxy polymer.

14. The composition of claim 1, wherein the optional at least one polymers comprise a carbonate unit of the formula

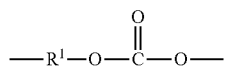

wherein R$^1$ is derived from a bisphenol compound of the formula:

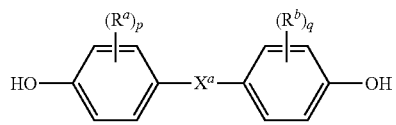

wherein
each of Ra$^a$ and R$^b$ is independently a halogen atom or a monovalent hydrocarbon group;
p and q are each independently integers of 0 to 4; and
X$^a$ is a single bond or a group of the formula:

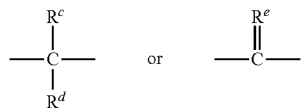

wherein each R$^c$ and R$^d$ is independently hydrogen, C$_{1-12}$ alkyl, C$_{1-12}$ cycloalkyl, C$_{7-12}$ arylalkyl, C$_{1-12}$ heteroalkyl, or cyclic C$_{7-12}$ heteroarylalkyl, and R$^e$ is a divalent C$_{1-12}$ hydrocarbon group.

15. The composition of claim 14, wherein the carbonate unit is derived from bisphenol A.

16. The composition of claim 1 comprising, based on the sum of the wt % of the poly(etherimide-siloxane) copolymer, the second polymer, and the polycarbonate,
at least 1 wt % of the poly(etherimide-siloxane) copolymer,
at least 30 wt % of the second polymer; and
0 to 60 wt % of the polycarbonate.

17. The composition of claim 1 having a hydrogen to carbon ratio of 0.81:1 to 0.88:1.

18. The composition of claim 1, having a density of less than 1.31 g/cc.

19. The composition of claim 1, having a density of less than 1.30 g/cc.

20. The composition of claim 1, having an E662 smoke test Dmax value of less than 100 when measured at a thickness of 1.6 mm.

21. The composition of claim 1, wherein an article molded from the composition has a room temperature notched Izod impact of greater than 500 J/m as measured according to ASTM D 256-10 at a 0.125 inch (3.2 mm) thickness.

22. The composition of claim 1, wherein an article molded from the composition has a haze less of less than 15% and a transmission greater than 75%, each measured using the color space CIE1931 (Illuminant C and a 2° observer) at a 0.125 inch (3.2 mm) thickness.

23. The composition of claim 22, wherein an article molded from the composition has a room temperature notched Izod impact of greater than 500 J/m as measured according to ASTM D 256-10 at a 0.125 inch (3.2 mm) thickness.

24. The composition of claim 1, further comprising 0.5 to 3 parts per hundred parts by weight of titanium dioxide, based on the sum of the wt % of the first, second, and optional at least one polymers.

25. The compositions of claim 1, wherein the composition is substantially free of a fibrillated, fluorinated polyolefin.

26. An article selected from a molded article, a thermoformed article, a foamed article, an extruded film, an extruded sheet, one or more layers of a multi-layer article, a substrate for a coated article, or a substrate for a metallized article made from the composition of claim 1.

27. The article of claim 26, wherein the article is a component of an aircraft interior or a train interior.

28. The article of claim 27, wherein the article is selected from an access panel, access door, air flow regulator, air gasper, air grille, arm rest, baggage storage door, balcony component, cabinet wall, ceiling panel, door pull, door handle, duct housing, enclosure for an electronic device, equipment housing, equipment panel, floor panel, food cart, food tray, galley surface, handle, housing for television, light panel, magazine rack, telephone housing, partition, part for trolley cart, seat back, seat component, railing component, seat housing, shelve, side wall, speaker housing, storage compartment, storage housing, toilet seat, tray table, tray, trim panel, window molding, window slide, or window.

29. A composition comprising:
a first polymer comprising a poly(etherimide-siloxane) copolymer comprising (a) a repeating polyetherimide unit, and (b) a repeating poly(siloxane) block unit derived from a polysiloxane diamine of the formula:

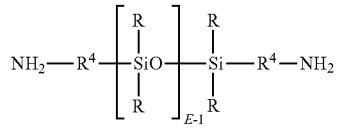

wherein
R is methyl, R$^4$ is 1,3-propylene, and E is 5 to 100;
a second polymer different from the first polymer and comprising bromine, the second polymer being a brominated polycarbonate comprising 25 to 35 mol % of units derived from 2,2'6,6'tetrabromo-4,4'isopropylidienediphenol and 65 to 75 mole % of units derived from Bisphenol A; and an optional one or more polymers comprising a polycarbonate different from the second polymer;
wherein
the composition is free of copolymers comprising carbonate units and ester units,
the wt % of the first polymer, second polymer, and optional one or more polymers sum to 100 wt %,
siloxane units are present in the composition in an amount of 0.3 to 3.5 wt %, based on the sum of the wt % of the first, second, and optional one or more polymers, and
bromine is present in the composition in an amount of 7.8 to 13 wt %, based on the sum of the wt % of the first, second, and optional one or more polymers; and
further wherein an article molded or formed from the composition has
an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), and
an E662 smoke test Dmax value of less than 200 when measured at a thickness of 1.6 mm.

* * * * *